US008534545B2

(12) United States Patent
Nishiguchi et al.

(10) Patent No.: US 8,534,545 B2
(45) Date of Patent: Sep. 17, 2013

(54) CROP TRACEABILITY SYSTEM AS WELL AS SERVER, METHOD, AND PROGRAM USED FOR THE SAME

(75) Inventors: Osamu Nishiguchi, Tokyo (JP); Noriko Yamagata, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 215 days.

(21) Appl. No.: 13/035,559

(22) Filed: Feb. 25, 2011

(65) Prior Publication Data

US 2011/0290873 A1    Dec. 1, 2011

(30) Foreign Application Priority Data

May 28, 2010    (JP) .................................. 2010-122993

(51) Int. Cl.
    *G06F 7/00*    (2006.01)
(52) U.S. Cl.
    USPC ............................................. 235/376; 702/3
(58) Field of Classification Search
    USPC ............................................ 235/376; 702/3
    See application file for complete search history.

(56) References Cited

U.S. PATENT DOCUMENTS

| 2006/0030990 A1 | 2/2006 | Anderson et al. |
| 2006/0271555 A1 | 11/2006 | Beck et al. |
| 2007/0185748 A1 | 8/2007 | Anderson et al. |
| 2010/0223009 A1* | 9/2010 | Anderson et al. ................. 702/3 |

FOREIGN PATENT DOCUMENTS

| EP | 1 346 622 A1 | 9/2003 |
| JP | 3355366 B2 | 11/1998 |
| WO | 02/37375 A1 | 5/2002 |
| WO | 2009/158445 A2 | 12/2009 |

* cited by examiner

*Primary Examiner* — Karl D Frech
(74) *Attorney, Agent, or Firm* — Mattingly & Malur, PC

(57) ABSTRACT

A crop traceability system includes: a terminal which moves together with a machine to harvest or transport a crop; and a server which receives an information from the terminal. The terminal includes: a location information acquisition unit which acquires a location information of the terminal; and a transmitter which transmits the location information and a machine ID of the machine to the server. The server includes: a storage unit which stores a location information of a planimetric feature; a receiver which receives the location information and the machine ID which are transmitted by the terminal; and an ID information processor which links the machine ID with a planimetric feature ID of the planimetric feature when a location information of the planimetric feature stored in the storage unit coincides with the location information transmitted by the terminal.

17 Claims, 20 Drawing Sheets

FIG. 2A
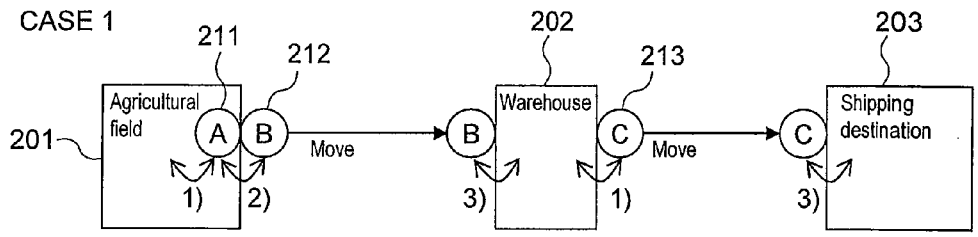
FIG. 2B
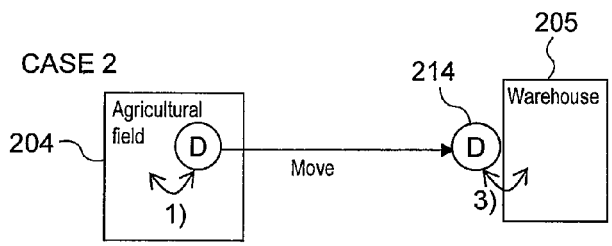
FIG. 2C
221 — Linking patterns
| | |
|---|---|
| 1) | Planimetric feature to machine |
| 2) | Machine to machine |
| 3) | Machine to planimetric feature |
FIG. 2D
231 — Machine type and linked objects
| Machine | From | To | Machine example |
|---|---|---|---|
| A | 1) | 2) | Combine |
| B | 2) | 3) | Truck |
| C | 1) | 3) | Large truck |
| D | 1) | 3) | Tractor plus attachment |

FIG. 5A

FIG. 5B (1) Harvester B works in farmland A

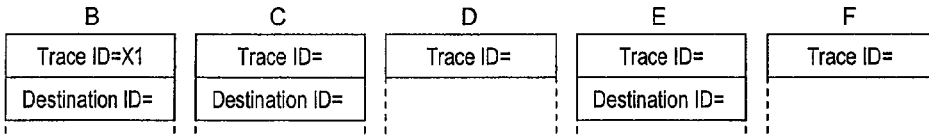

(2) Transportation machine C contacts harvester B

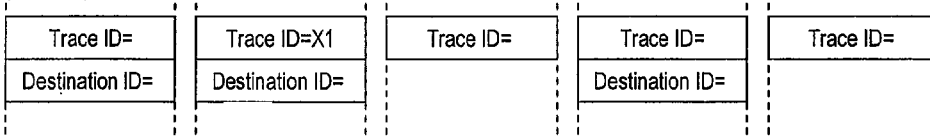

(3) Transportation machine C arrives at warehouse D

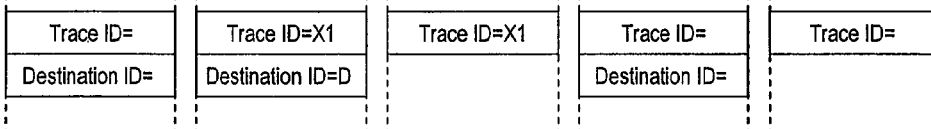

(4) Transportation machine C is away from warehouse D

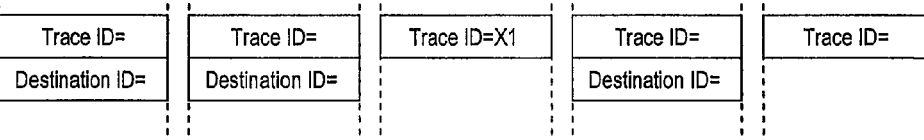

(5) Transportation machine E arrives at warehouse D

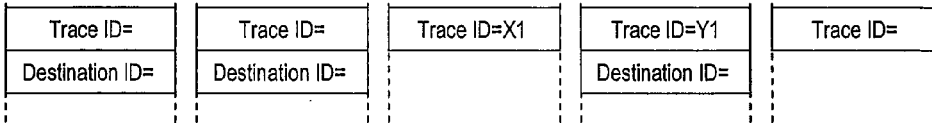

(6) Transportation machine E arrives at warehouse F

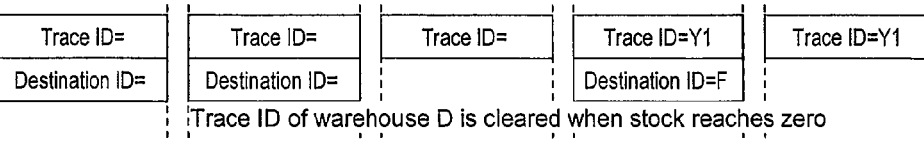

Trace ID of warehouse D is cleared when stock reaches zero (7) Transportation machine E is away from warehouse F

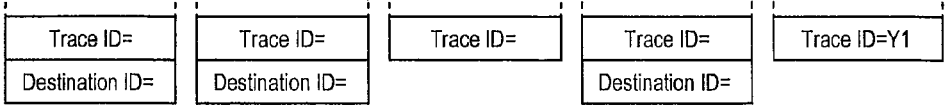

FIG. 11A

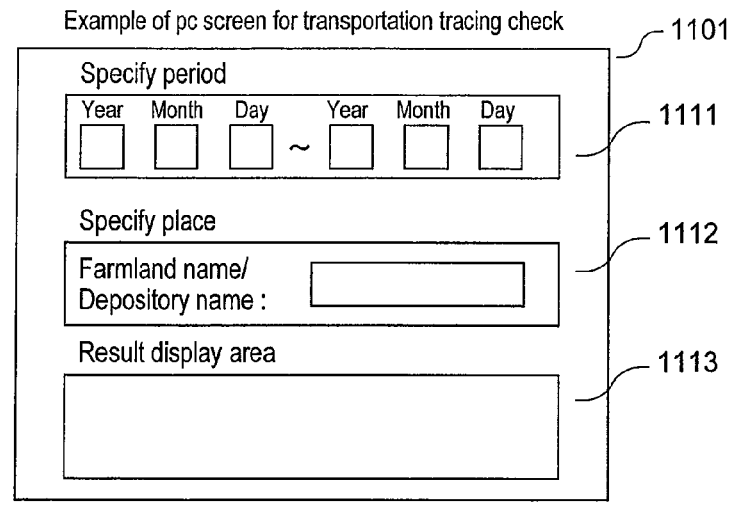

Example of pc screen for transportation tracing check — 1101

Specify period — 1111
Year Month Day ~ Year Month Day

Specify place — 1112
Farmland name/ Depository name :

Result display area — 1113

FIG. 11B

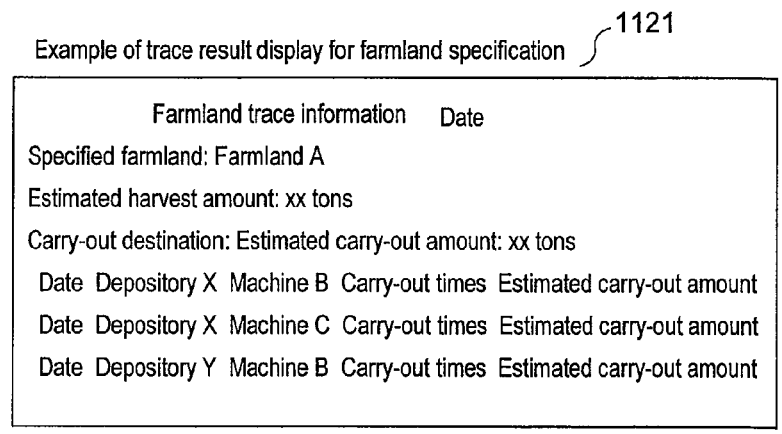

Example of trace result display for farmland specification — 1121

Farmland trace information   Date
Specified farmland: Farmland A
Estimated harvest amount: xx tons
Carry-out destination: Estimated carry-out amount: xx tons
 Date  Depository X  Machine B  Carry-out times  Estimated carry-out amount
 Date  Depository X  Machine C  Carry-out times  Estimated carry-out amount
 Date  Depository Y  Machine B  Carry-out times  Estimated carry-out amount

FIG. 11C

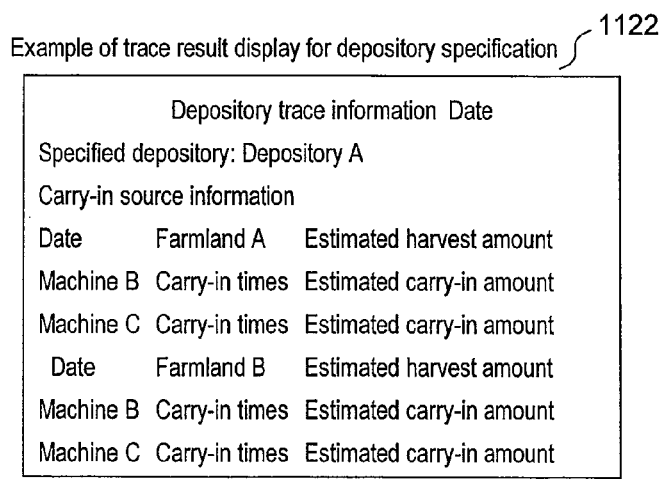

Example of trace result display for depository specification — 1122

Depository trace information  Date
Specified depository: Depository A
Carry-in source information
 Date         Farmland A    Estimated harvest amount
 Machine B  Carry-in times  Estimated carry-in amount
 Machine C  Carry-in times  Estimated carry-in amount
  Date        Farmland B    Estimated harvest amount
 Machine B  Carry-in times  Estimated carry-in amount
 Machine C  Carry-in times  Estimated carry-in amount

S1251

(1) Compare machine route table with received location information. Output alert on screen, if received location information is predetermined distance away from planned route.
(2) Execute processes in S402 and after in FIG. 4A

CROP TRACEABILITY SYSTEM AS WELL AS SERVER, METHOD, AND PROGRAM USED FOR THE SAME

BACKGROUND OF THE INVENTION

1. Field of the Invention

The present invention relates to a crop traceability system as well as a server, a method and a program which are used for the system, and particularly relates to a technique of tracing a crop based on location information.

2. Description of the Related Art

Distributors and consumers have been paying more attention to a place of origin, a use history of an agricultural chemical, and the like of a crop. There is provided a system of crop traceability, for example, as described in Patent Document 1. Specifically, in the system, an ID is assigned to each of objects themselves such as melons or the like, or each of bunches of objects in packages or the like such as strawberries, and the ID is passed on to a consumer via a distributor while accompanying with the object or the bunch of objects. Thereby, it is possible for the distributor or the consumer to refer to a place of origin or production history information which is linked with the assigned ID.

Patent Document 1: Japanese Patent No. 3355366

SUMMARY OF THE INVENTION

The technique described in Patent Document 1 above is effective to a crop such as melons or strawberries which are not changed in individual appearance in shipping or packaged in a place near the production field and are delivered to end consumers without changing the packing style.

However, it is difficult to apply the technique described in Patent Document 1 to a crop which is transported so-called "in bulk" until a middle stage of distribution, like grain, for example.

Furthermore, in the aforementioned technique described in Patent Document 1, an ID sticker is not attached to a crop until the crop is sacked in a work place or a warehouse after being transported from a farmland. Thus, checking whether or not the crop is harvested in an appropriate farmland necessarily depends on manual work based on an instruction described on paper or the like. This means that a possible mistake in associating the crop with a farmland leads to losing the reliability of the data serving as a base of the system, even if a history of cultivation in a farmland is recorded in detail and a traceability system for distribution processes is established. Accordingly, the traceability system to be used in a later distribution stage might be meaningless.

The present invention solves the problem and automatically links a transported crop with a farmland or a facility such as a greenhouse which is a harvest place thereof. Thereby, the present invention aims to implement a more reliable traceability system for distribution processes.

An aspect of the present invention provides a crop traceability system including: terminals each of which transmits a location information of the terminal itself and a machine ID of a harvester or a transportation machine for a crop (hereinafter, referred to as a machine) which moves together with the terminal itself; and a server which includes a communication unit and an ID information linking processor, the communication unit receiving the machine ID and the location information of the machine from each of the terminals, the ID information linking processor detecting that the terminals have the same location information or that one of the terminals has the same location information as that of a planimetric feature held by the server and thereby automatically linking the machine IDs of the corresponding machines together or the machine ID of the corresponding one of the machines and a planimetric feature ID of the planimetric feature together.

Furthermore, a server device used in a crop traceability system is provided, the server device including: a communication unit that receives, from respective terminals each of which transmits a location information of the terminal itself and a machine ID of a harvester or a transportation machine for a crop (hereinafter, referred to as a machine) which moves together with the terminal itself, the machine IDs and location information s of the machines; and an ID information linking processor that detects that the terminals have the same location information or that one of the terminals has the same location information as that of a planimetric feature held by the server and thereby automatically linking the machine IDs of the corresponding machines together or the machine ID of the corresponding one of the machines and a planimetric feature ID of the planimetric feature together.

Another aspect of the present invention provides a crop tracing method including: a receiving step in which, from respective terminals each of which transmits a location information of the terminal itself and a machine ID of a harvester or a transportation machine for a crop (hereinafter, referred to as a machine) which moves together with the terminal itself, the machine IDs and location information s of the machines are received; and an ID information linking step in which the terminals are detected to have the same location information or one of the terminals is detected to have the same location information as that of a planimetric feature held by the server and the machine IDs of the corresponding machines or the machine ID of the corresponding one of the machines and a planimetric feature ID of the planimetric feature are automatically linked together.

The present invention may provide a program for causing a computer to execute the crop tracing method, and may also provide a computer readable storage medium that stores therein the program.

Furthermore, the present invention provides a crop traceability system comprising: a terminal which moves together with a machine to harvest or transport a crop; and a server which receives an information from the terminal, in which the terminal includes: a location information acquisition unit which acquires a location information of the terminal; and a transmitter which transmits the location information and a machine ID of the machine to the server, and the server includes: a storage unit which stores a location information of a planimetric feature; a receiver which receives the location information and the machine ID which are transmitted by the terminal; and an ID information processor which links the machine ID with a planimetric feature ID of the planimetric feature when a location information of the planimetric feature stored in the storage unit coincides with the location information transmitted by the terminal.

According to an embodiment of the present invention, the more reliable traceability system for distribution processes can be implemented.

BRIEF DESCRIPTION OF THE DRAWINGS

FIGS. 2A and 2B are diagrams showing examples of linking between a machine and a planimetric feature in the crop traceability system. FIG. 2C is a table showing patterns of linking with a machine. FIG. 2D is a table showing linked objects (From and To) depending on the machine type.

FIG. 5A is a diagram showing an example of a route including planimetric features and machines in the first embodiment. FIG. 5B is a diagram showing how the planimetric features and the machines are linked, by taking the route in FIG. 5A as an example and by using trace IDs.

FIG. 6A is a planimetric-feature attribute management master for managing attributes of the planimetric features, FIG. 6B is a machine attribute management master for managing attributes of the machines, and FIG. 6C is a machine transaction table for managing transition of machine linking.

FIG. 7A is a diagram showing a configuration example of a stock information management table for managing stocks of depositories or the like. FIG. 7B is a table showing storage place attributes.

FIG. 9A shows an example of attaching IC tags corresponding to storage places. FIG. 9B shows an example of storing information of storage places in IC tags. FIG. 9C shows an example of a transmission data format used by a terminal in the third embodiment.

FIG. 11A shows a display example of a transportation tracing check screen of a PC for checking a transportation result in a firth embodiment. FIG. 11B shows an example of trace result display for farmland specification. FIG. 11C shows an example of trace result display for depository specification.

FIG. 12C shows some processes to be changed in FIG. 4A, and FIG. 12D shows a flow of a transportation route determination process.

DESCRIPTION OF THE PREFERRED EMBODIMENTS

Figure 1A:
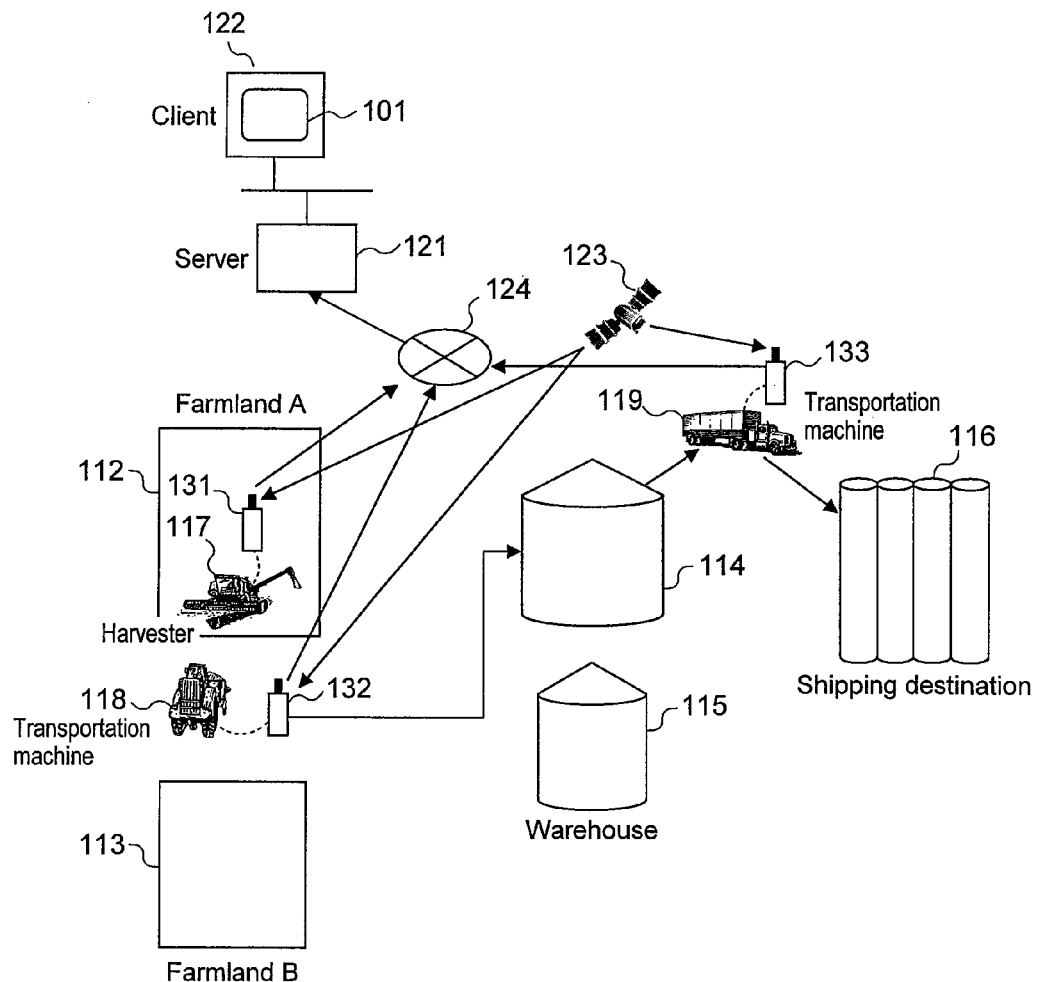
FIG. 1A is a diagram showing an overall configuration example of a crop traceability system.

Harvesting a crop such as grain using a machine is performed in such a manner that a harvester enters a farmland and moves in the farmland. The harvested crop is loaded on a transportation machine to be transported to a warehouse or a work place. If the locations of the farmland for the harvest and a depository or the like (the warehouse or a shipping destination) are known by, for example, a geographic information system (GIS) and if the location of the harvester or the transportation machine is detected by, for example, a global positioning system (GPS), it can be judged in which farmland the crop is harvested by the machine and to which storage or the like the crop is transported, by using pieces of location information provided by the GIS and the GPS.

Hence, attention is focused on this to provide a crop traceability system according to embodiments. The crop traceability system includes a server, terminals, and the like. By using the GIS, the server in advance manages pieces of information on planimetric features of fixed materials related to production and storage of the crop, for example, a farmland, a house, a warehouse, a work place, and the like. Each of the terminals has a function of storing IDs assigned to the harvesters and the transportation machines and is capable of acquiring a location information piece thereof by using the GPS or the like while the transportation machine moves. In the system, the terminal regularly transmits to the server an ID of the harvester or the transportation machine and a location information piece thereof. The server receives the piece of information and automatically links IDs of a planimetric feature and the terminal, or IDs of the terminal and a terminal, on condition that, for example, the two objects stay in the same place for a predetermined time period. Thereby, it is possible to automatically record the piece of information on tracing (relaying) a crop in transporting the crop from the farmland to a warehouse with a machine.

For example, a typical example of work of harvesting grain such as wheat shows the following flow. A combine enters a wheat field (an agricultural field) and harvests the wheat therein for a certain time period. The harvested wheat is transferred from the combine onto a transportation truck parked by the combine, during a certain time period or longer. Then, the truck transports the wheat to a depository.

In this case, it is possible to automatically link the combine and a certain farmland based on a location information piece on condition that, for example, the combine stays in the farmland for a predetermined time period or longer. In addition, it is possible to automatically link the truck and the combine on condition that, for example, the truck stays by the combine for a predetermined time period or longer, and further to link a certain warehouse and the truck on condition that, for example, the truck stays by the warehouse for a predetermined time period or longer. Such a series of processes makes it possible to automatically link the warehouse and the farmland. In this case, there is no manual process, thus enhancing reliability of the crop traceability.

Also in a case where a crop once stored in a certain warehouse is moved to another place such as a shipping place by using, for example, a large truck, the warehouse and the large truck or the like are linked together on condition that the large truck stays by the warehouse for a predetermined time period or longer. In a case where the crop is transported to a certain processing place by the large truck, the processing place and the large truck are automatically linked together on condition that the large truck stays by the processing place for a predetermined time period or longer. Thereby, it is possible to check a production history of the crop transported to the processing place by tracing the linking from the processing place to the warehouse, and further from the warehouse to the farmland.

In contrast, in a case where the harvested crop is left in a farmland for a while, picked up by a truck later, and then transported to a warehouse, what is needed to be linked to the agricultural field is not a harvester but the truck. Difference from the wheat example described above is that harvesting methods depending on agricultural fields are managed by the server and thus it is possible to judge what should be linked with the agricultural field. This is because the types of machines and crops can be categorized and thus use combination of a machine and a farmland can be determined in advance as will be described later.

In the specification, a machine includes a harvester for harvesting a crop in a farmland, a transportation machine for transporting the harvested crop, and the like. A terminal only needs to be associated with a machine. The specification includes modes in which: a terminal is built in a machine, that is, the terminal is used in a machine-built-in state; and a terminal is separated from a machine as in a mobile terminal; and so on. The specification also includes a mode in which a crop is transported manually or by a bicycle.

A farmland, a warehouse (a depository), a shipping destination, and the like are herein collectively referred to as a planimetric feature. The location of a planimetric feature is basically fixed and known by using the GIS or the like. In contrast, a machine has a characteristic that the position thereof changes over time.

Description will be given below in detail with regard to a crop traceability system according to embodiments of the present invention with reference to the accompanying drawings.

First Embodiment

In the first place, description will be given with regard to an example in which a crop traceability system according to a first embodiment is applied to a harvest of grain. FIG. 1A is a diagram showing an outline principle of the crop traceability system according to this embodiment. As shown in FIG. 1A, grain is harvested by a harvester 117 in a farmland A 112 which is one of farmlands A 112, B 113 at different locations, the harvested grain is transferred to a transportation machine 118 parked by the farmland A 112, and the transportation machine 118 transports the grain to a warehouse (depository) 114 which is one of warehouses 114, 115 and stores the grain therein. FIG. 1A also shows that the grain stored in the warehouse 114 is transported to a shipping destination 116 by a transportation machine 119.

The harvester 117, the transportation machine 118, and the transportation machine 119 are respectively equipped with terminals 131, 132, 133 or the like and designed to move together with the terminals 131, 132, 133. The terminals 131, 132, 133 are each capable of storing an ID of the corresponding machine, acquiring a piece of location information piece thereof by utilizing an electric wave from a GPS 123, and, for example, regularly transmitting the machine ID and the location information piece to a server 121 via a network 124. Specifically, each of the terminals 131, 132, 133 or the like herein may be such one as a mobile phone or may be such one as a transmitter incorporated into a machine or such one that turns on at the start of the machine as long as it has a system to transmit a machine ID and a piece of location information to a server. Hereinafter, a mechanism capable of transmitting a machine ID and a piece of location information is referred to as a terminal.

The harvester 117 harvests grain while moving in the farmland 112. The location of the terminal 131 of the harvester 117 changes with the movement of the harvester 117. The terminal 131 acquires a piece of location information by using the GPS 123 regularly (at regular intervals, at any time, or at different intervals) and transmits the acquired location information piece to the server 121 together with an ID of the harvester 117 stored in the terminal 131. The server 121 receiving the location information piece from the terminal 131 has in advance managed pieces of location information of the farmland 112 by using the GIS, and thus can know in which farmland the harvester 117 works, by searching the GIS based on the transmitted location information piece on the harvester 117. Thereby, the server 121 can link the harvester 117 and the farmland 112 together (link the harvesting using the harvester 117 and a place of the harvesting which is the farmland 112 together).

After the harvesting using the harvester 117 is completed, the harvested grain is moved to the transportation machine 118 parked in or near the farmland 112. The transportation machine 118 is also equipped with the terminal 132 having the similar function as that of the terminal 131, and the terminal 132 regularly transmits an ID of the transportation machine 118 and a piece of location information to the server 121. The server 121 can know which transportation machine is parked by the harvester 117 linked with the farmland 112 and can know the fact that the harvested grain is transported, that is, can link the harvester 117 and the transportation machine 118. Thereafter, when the transportation machine 118 moves to the warehouse 114 to carry the transported grain in the warehouse 114, the server 121 can know to which warehouse the transportation machine 118 has moved because the server 121 knows locations of the warehouses 114, 115 and the transportation machine 118. Thereby, the server 121 can link the transportation machine 118 and the warehouse 114 together.

As the result of the process above, it is possible to link together the warehouse 114 and the transportation machine 118, the transportation machine 118 and the harvester 117, and the harvester 117 and the farmland 112, and to automatically create a series of data pieces to indicate in which farmland a crop carried in a warehouse is harvested, that is, data pieces for crop traceability.

Meanwhile, the grain temporarily stored in the warehouse 114 is shipped and transported to the shipping destination 116 by, for example, another transportation machine 119. Also in this case, the server 121 identifies that the transportation machine 119 is parked by the warehouse 114 on the basis of a piece of location information, and thereby can automatically link the warehouse 114 and the transportation machine 119 together. In addition, the server 121 can automatically link the shipping destination 116 and the transportation machine 119 together on condition that the transportation machine 119 is located near the shipping destination 116. In this manner, it is possible to perform linking between the shipping destination 116 and the transportation machine 119 and between the transportation machine 119 and the warehouse 114.

Such a series of processes makes it possible to automatically record in which farmland the crop transported to the shipping destination 116 is actually harvested and in which warehouse the crop is stored.

Figure 1B:
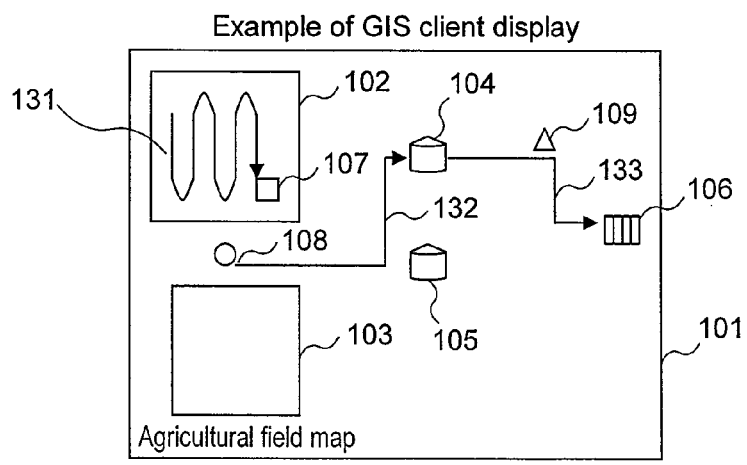
FIG. 1B is a diagram showing a display screen example of a client.

The GIS includes, for example, the server 121 and a client 122. In FIG. 1B, reference numeral 101 denotes a display screen of the client 122 as an example. The screen 101 shows: a farmland map 102 on which a depository icon 104 representing the warehouse 114, a shipping destination icon 106 representing the shipping destination 116, and the like are arranged; and how a harvester icon 107 representing the harvester 117, transportation machine icons 108, 109 representing the transportation machines 118, 119 move on the screen in accordance with movements of the machines. The movement trajectories as denoted by reference numerals 131, 132, 133 can be displayed on the screen, because the terminals 131, 132, 133 mounted on the machines transmit the locations of the machines regularly.

Figure 1C:
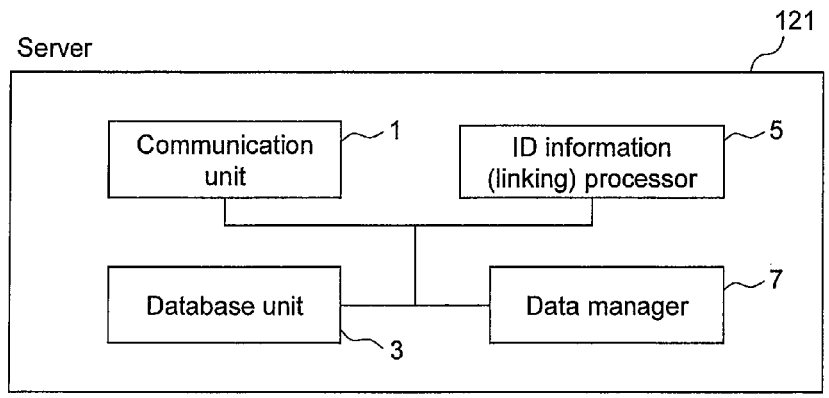
FIG. 1C is a functional block diagram showing a configuration example of a server device.

FIG. 1C is a functional block diagram showing an example of a schematic configuration of the server 121. The server 121 includes: a communication unit 1 through which the server 121 communicates with the terminals 131, 132, 133; a database unit 3 which stores pieces of map information based on the GIS and various tables to be described later; a data manager 7 and an ID information processor (ID information linking processor) 5 which manage data in the various tables and the like; a CPU which performs overall control on the server 121; and the like. Note that the database unit 3 for storing the various tables may be configured to be accessed from the server 121, for example, through a network. The server 121 executes processes and flows to be described later by controlling the other component units of the system by the CPU.

Figure 1D:
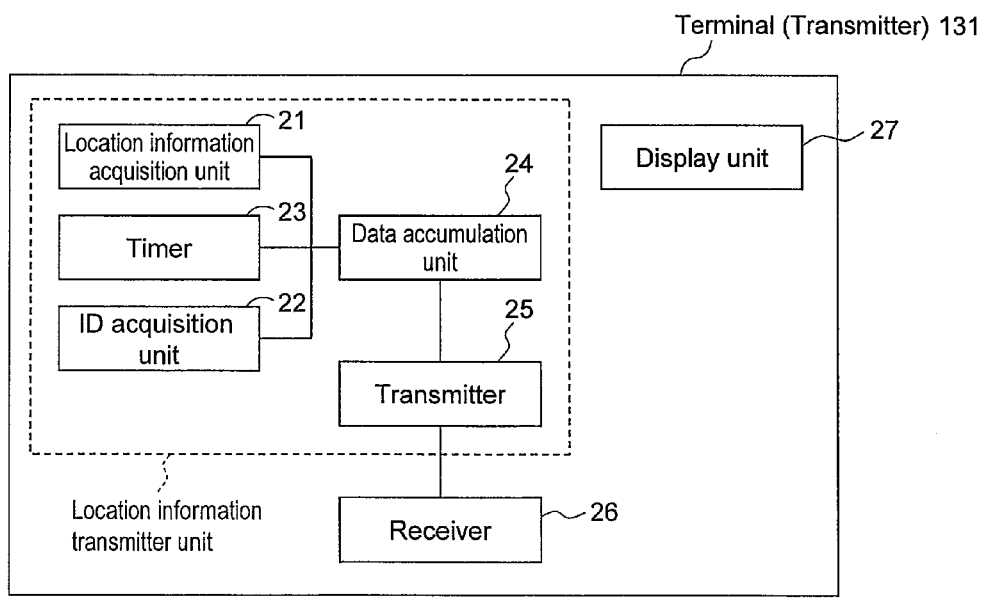
FIG. 1D is a functional block diagram showing a configuration example of a terminal.

As shown in FIG. 1D, the terminal (transmitter) 131 or the like includes a location information transmitter unit, a CPU which performs overall control on the terminal 131, and the like. The location information transmitter unit includes: a location information acquisition unit 21 which acquires a location information piece thereof by using the GPS or the like; an ID acquisition unit 22 which acquires a machine ID; a timer 23; a data accumulation unit 24 which stores the ID, the location information piece acquired from the location information acquisition unit 21, and a time of day acquired from the timer 23; a transmitter 25 which transmits the data stored in the data accumulation unit 24 to the server 121 when the timer 23 reaches a predetermined time of day. The terminal 131 executes processes and flows to be described later by controlling the other component units of the system by the CPU. The terminal 131 may include a receiver 26 and a display unit 27 used in an embodiment to be described later.

A harvester, an agricultural machine or the like (a movable object) has a role of linking places (fixed objects) together where a crop exists, such as a farmland and a warehouse, or a warehouse and a shipping destination. What to be linked with each of machines of various types is determined in advance according to the types and the like of crops and machines. Exemplary description will be given with regard to this point with reference to FIGS. 2A to 2D. Case 1 in FIG. 2A is a schematic diagram showing, as in the example described so far, that a crop is harvested by a harvester 211 in a farmland 201, the harvested crop is transported to a warehouse 202 by using a transportation machine 212, and the crop temporarily stored in the warehouse 202 is transported to another place 203 by using a transportation machine 213. Case 2 in FIG. 2B is a schematic diagram showing that a harvested crop is left in a farmland for a while, and another transportation machine 214 enters the farmland and picks up and transports the crop to a warehouse 205. Generally, the harvesting and transportation of the crop falls under either Case 1 or Case 2.

There are three patterns in linking a machine by a server (FIG. 2C).

1) Linking a planimetric feature such as a farmland or a warehouse to a machine (planimetric-feature-to-machine linking) as in a case where the harvester 211 harvests a crop in the farmland 201, where the transportation machine 214 picks up the crop in a farmland 204, or where the transportation machine 213 receives a cargo in the warehouse 202.

2) Linking a machine (harvester 211) to a machine like the transportation machine 212 (machine-to-machine linking).

3) Linking a machine to a planimetric feature (machine-to-planimetric-feature linking) as in a case where the transportation machine 212, 213, or 214 arrives at a planimetric feature.

From and to what linking is established depend on the type of the machine. A table in FIG. 2D summarizes "Machine Type and Linked Objects." Linking of the harvester 211 (A) such as a combine is established from a planimetric feature 1) to a machine 2); the transportation machine 212 (B) such as a truck, from a machine 2) to a planimetric feature 3); the transportation machine 213 (C) such as a large truck and the transportation machine 214 (D) such as a tractor plus an attachment, from the planimetric feature 1) to the planimetric feature 3). Objects to be linked (a From attribute and a To attribute) are determined in advance according to the type of the machine and can be held or referred to by the server.

Processes executed by the terminal and the server will be described below. The description will be given with reference to FIGS. 1C and 1D, if needed.

Figure 3A:
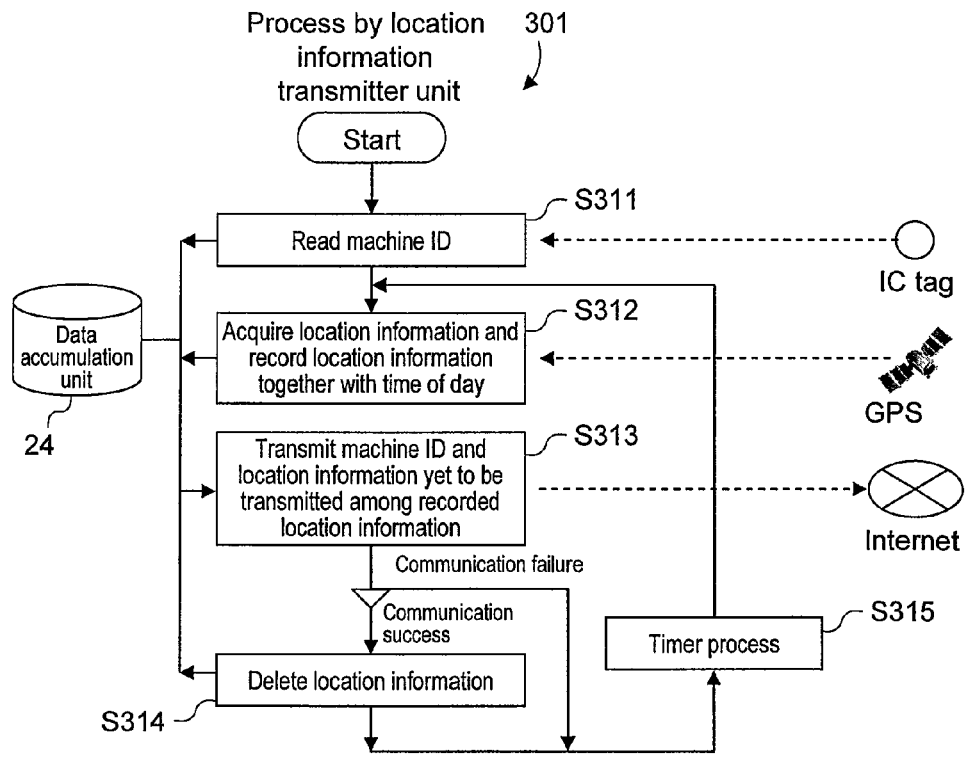
FIG. 3A is a flowchart showing a flow of a process performed by a location information transmitter unit.

FIG. 3A is a flowchart showing an internal process related to location information transmission by a terminal. Each of the harvesters and transportation machines is provided with an IC chip or the like in which a unique ID for identifying the machine is stored. The ID acquisition unit 22 of the terminal reads a piece of information of the IC chip or the like attached to the machine (Step S311) and records the information piece in the data accumulation unit 24. If the terminal is mounted on a new machine, the piece of the ID information is overwritten at the time of reading a piece of ID information of the new machine. Note that if the terminal (transmitter) is fixed to the machine, the ID may be stored in the transmitter in advance.

Next, the location information acquisition unit 21 regularly acquires a piece of location information by using the GPS (Step S312) and records the location information piece and a piece of information on an acquisition time of day (based on a clock of the timer 23) in the data accumulation unit 24 to accumulate information pieces. Furthermore, the transmitter 25 transmits the machine ID and a piece of location information which has not been transmitted to the server 121 yet among the recorded location information pieces (Step S313). If the communication succeeds, the transmitter 25 deletes the recorded location information piece (Step S314), and the process moves to a timer process (Step S315) performed by the timer 23 and then moves to an acquisition process for a next piece of location information (Step S312), the timer process expiring at timing (at predetermined timing of one-minute intervals, for example) of the acquisition process. If the communication fails, the recorded location information piece is not deleted, and the process moves to the next timer process (Step S315) and then moves to the acquisition process for a next piece of location information (Step S312).

Figure 3B:
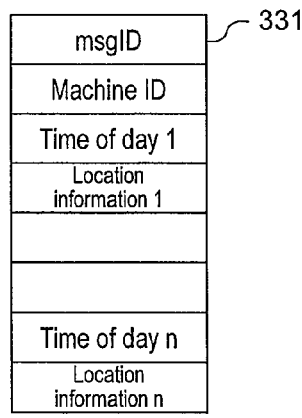
FIG. 3B is a diagram showing an example of a transmission data format to be transmitted to the server from the terminal.

FIG. 3B is a diagram showing an example of a transmission data format 331 to be transmitted to the server by the terminal using the process shown in FIG. 3A. The transmission data format 331 is shown by a table having a machine ID and pairs of a piece of location information and a piece of information on a time of day, the pairs being arranged in time series. If there are some types of information pieces to be transmitted by the terminal, a column msgID is provided to identify the type of a message.

Figure 4A:
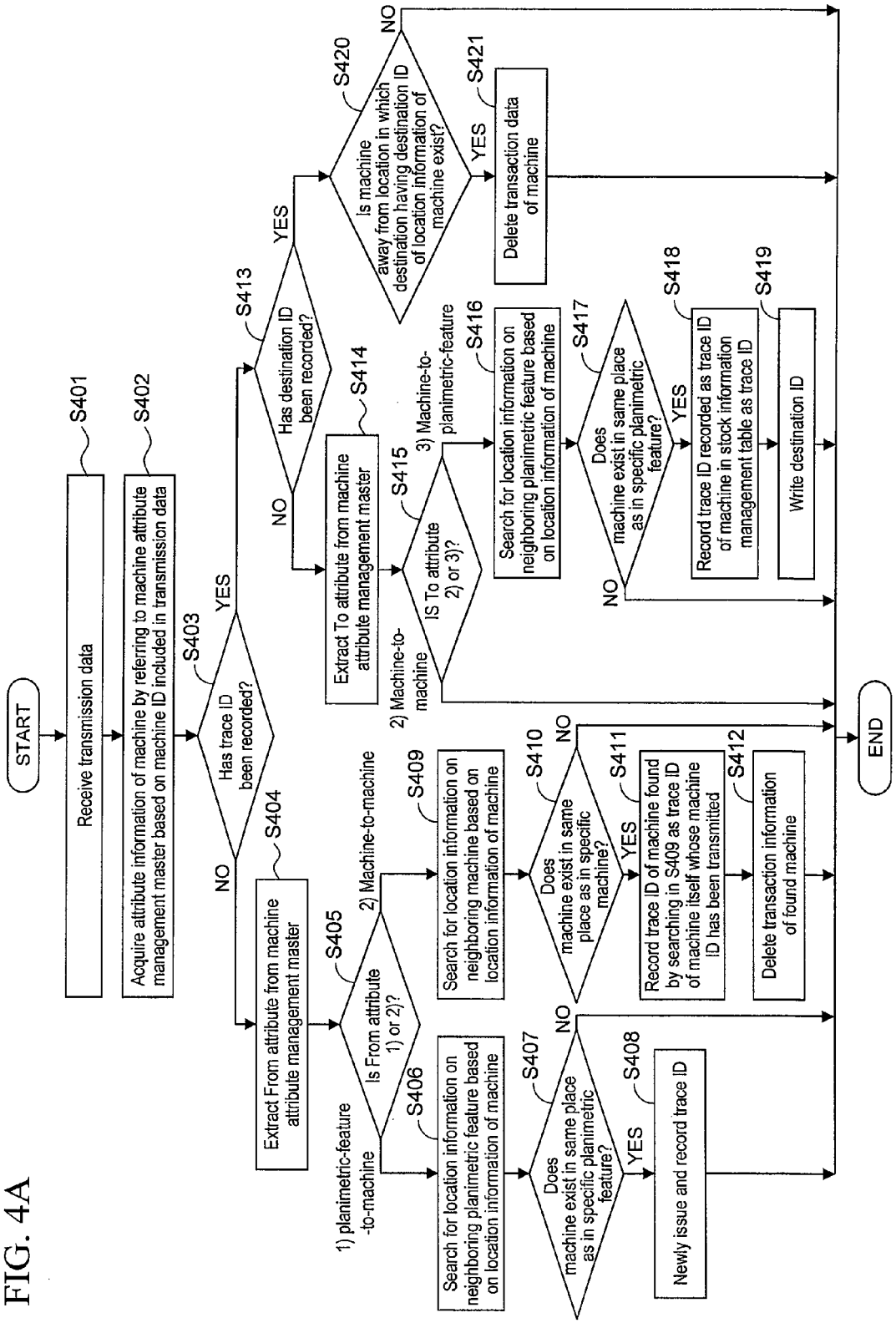
FIG. 4A is a flowchart showing a process of linking a machine and a planimetric feature together performed by the server in a first embodiment.

FIG. 4A is a flowchart showing a process of linking IDs together by the server. The format of data received by the server from the terminal is shown as the transmission data format 331 in FIG. 3B.

Figure 6A:
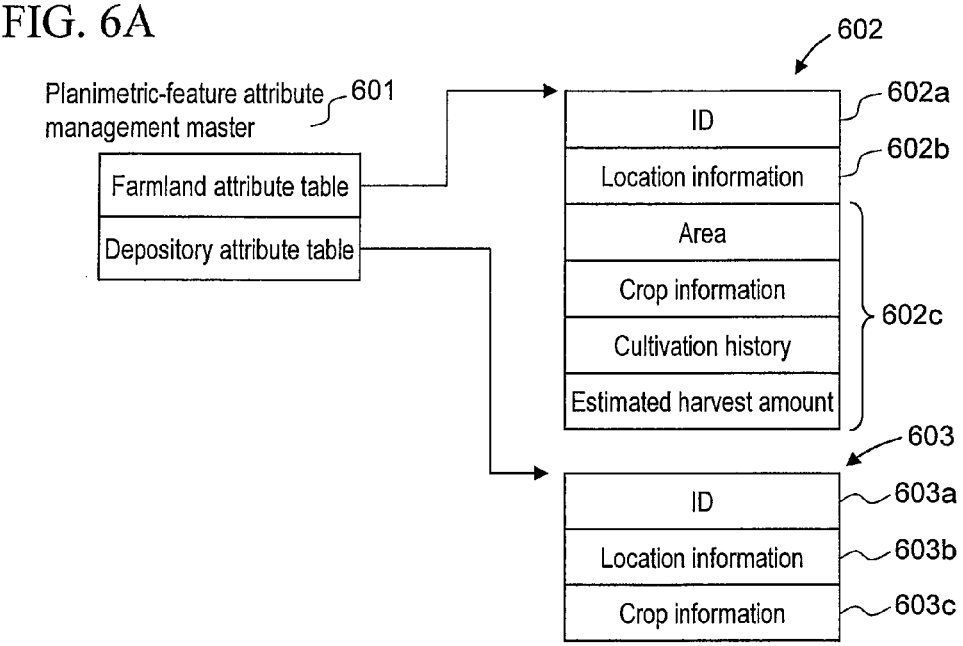
FIGS. 6A to 6C are examples of data tables stored in a database provided in the server and show configuration examples thereof.
Figure 6B:
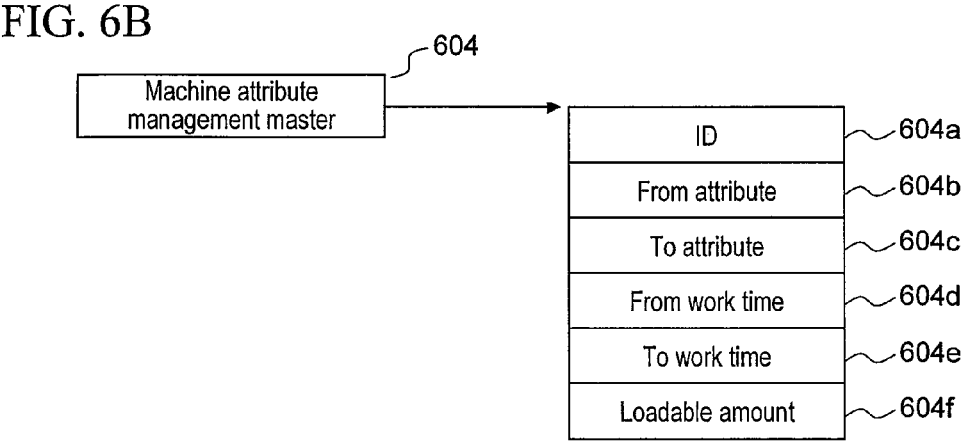
Figure 6C:
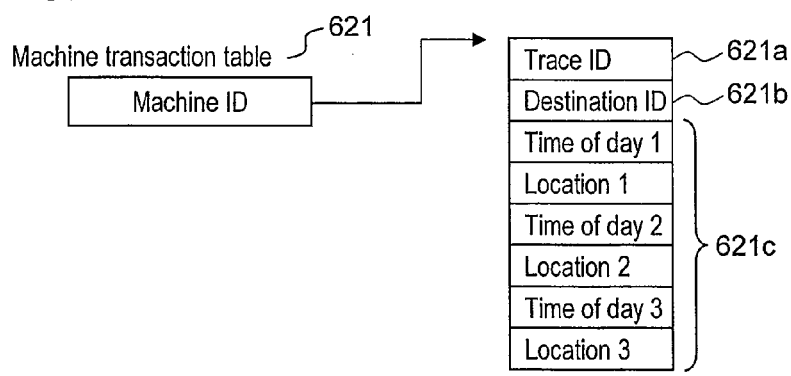

Firstly, description will be given with regard to tables managed by the server. Tables shown in FIGS. 6A to 6C, 7A and 7B, and 8 show configuration examples of the tables managed by the server. As shown in FIGS. 6A to 6C, the server manages a planimetric-feature attribute management master 601 for managing attributes of planimetric features (FIG. 6A) and a machine attribute management master 604 for managing attributes of the machines (FIG. 6B). The planimetric-feature attribute management master 601 includes a farmland attribute table 602 and a depository (warehouse) attribute table 603. The farmland attribute table 602 includes, as a farmland attribute, an ID 602a of a farmland and location information 602b thereof and also manages farmland attributes 602c which are the area crop information, a cultivation history, an estimated crop amount, and the like of a farmland. In addition, the depository attribute table 603 manages an ID 603a of a depository (a warehouse), depository location information 603b, and accommodated crop information 603c.

In addition, the machine attribute management master 604 manages an ID 604a of a machine, a From attribute 604b, and a To attribute 604c. The From attribute 604b and the To attribute 604c show information on which pattern should be used among machine linking patterns described in FIG. 2D. For example, as shown in FIG. 2D, a combine as an example of Machine A has a From attribute 604b of the planimetric feature-machine linking pattern 1) and a To attribute 604c of the machine-to-machine linking pattern 2) (see the machine 211 (A) in FIG. 2A). As described above, the From attribute 604b and the To attribute 604c are determined depending on the type of the machine. In addition, the machine attribute management master 604 manages machine attributes of a From work time 604d which is a minimum work time in loading a cargo, a To work time 604e which is a minimum work time in unloading the cargo, and a loadable amount 604f which can be loaded on a machine. Furthermore, the server has a machine transaction table 621 for recording what is linked with a machine and a machine location information history.

The machine transaction table 621 is a temporarily created table and has a trace ID 621a indicating with what a machine is linked, a destination ID 621b indicating a destination of the machine, and fields 621c showing paired pieces of information on a time of day of transmission from a terminal attached to the machine and location of the terminal, the paired pieces of information being arranged in time series.

Figure 7A:
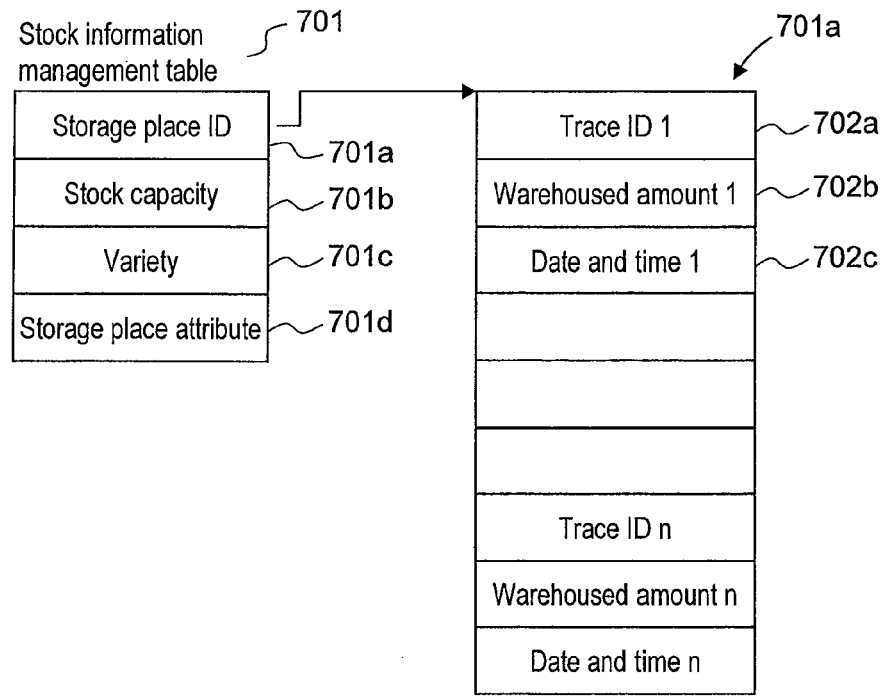
FIGS. 7A and 7B are each an example of a data table stored in the database provided in the server.
Figure 7B:
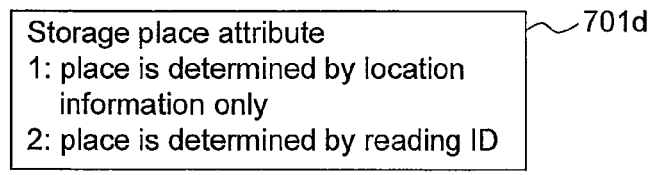

By referring to FIGS. 7A and 7B, a stock information management table 701 shown in FIG. 7A is a table for managing stocks of depositories (warehouses). If the same crop is transported to the same depository by a machine or machines several times, the stock information management table 701 manages an amount of a warehoused crop and a warehousing date and time on the basis of a unique trace ID assigned to each of the transportations. The stock information management table 701 has a role of associating a warehoused crop and a shipped crop with each other by recording the stock of the crop until the stock reaches zero after the crop is shipped one after another.

The table configuration examples will be described in detail. The stock information management table 701 includes a storage place ID 701a for identifying a storage place, a stock capacity 701b of the depository, a variety 701c of a stored crop, and a storage place attribute 701d (FIG. 7B) to be described later. The storage place ID 701a is linked with a trace ID 702a, a warehoused amount 702b, and a date and time 702c.

Figure 8:
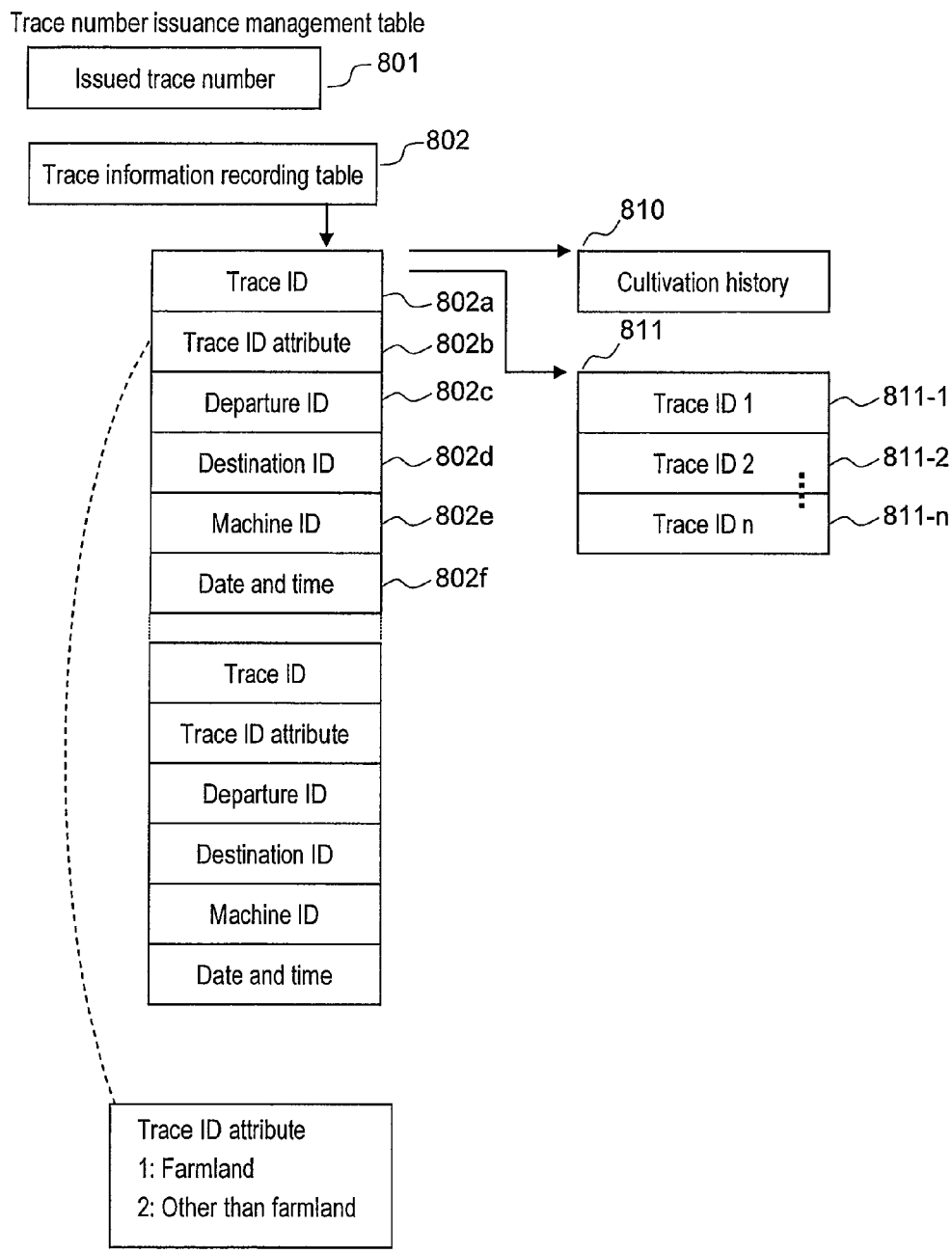
FIG. 8 is an example of a data table stored in the database provided in the server and is a diagram showing an example of a trace number issuance management table and a trace information recording table for managing trace IDs.

FIG. 8 shows: a trace information recording table 802 and a trace number issuance management table 801. The trace information recording table 802 is utilized, in a downstream process of a distribution, in referring to a crop cultivation history (including crop information) by using a trace ID as a key. The trace number issuance management table 801 manages unique trace IDs assigned to transportations. The trace information recording table 802 manages pieces of information related to a trace ID 802a which are pieces of information on from where (a departure ID 802c) a crop is transported, to where (a destination ID 802d), by what (a machine ID 802e), and when (a date and time 802f); a farmland cultivation history (including crop information) 810 and a series of trace IDs (1 to n) 811 recorded in the stock information management table 701 as of issuance of the trace ID 802a. The farmland cultivation history 810 is provided for a case where the trace ID 802a is issued when the crop is transported from a farmland. The series of trace IDs 811 are provided for a case where the trace ID 802a is issued when the crop is transported from a warehouse. Specifically, when a trace ID is issued and a crop is transported via a route shown by the departure ID 802c and the destination ID 802d, a trace ID and pieces of information corresponding to the trace ID are recorded in the trace ID 802a and fields 802b to 802f in the trace information recording table 802. In this case, the trace ID 802a is also linked with the cultivation history 810 and thus a history of cultivating the transported crop (crop information) can be known. When another transportation occurs, a new trace ID is issued, and another set of information pieces of the trace ID 802a to the date and time 802f is recorded in the trace information recording table 802. Note that the machine ID 802e is an ID of a transportation machine but is provided to the trace information recording table 802 incidentally. With reference to FIG. 5B, a trace ID=X1 is issued for transportations from a farmland A to a warehouse D. The trace ID=X1 is passed on to the warehouse D via a machine. In addition, when the transportation machine E arrives at the warehouse D, a new trace ID=Y1 is issued to a transportation from the warehouse D to a shipping destination F, which is passed on to the shipping destination F.

The trace information recording table 802 shown in FIG. 8 is designed to record pieces of information for each of the trace ID=X1 and the trace ID=Y1 in the trace ID 802a to the date and time 802f.

Meanwhile, suppose a case where a crop is transported multiple times (n times in FIG. 8) from the same farmland or from different farmlands to a depository, so that the crop is stored therein together with grain or the like. The crop traceability system is designed to properly record, even in the above case, pieces of trace information on a certain crop as a crop stored together with a different kind of crop, by managing the series of trace IDs 811-1 to 811-$n$ (n is an integer of 2 or larger) by using the trace information recording table 802.

Note that a trace ID attribute 802*b* is an identifier which indicates, as an attribute of a trace ID, either "1. Farmland" or "2. Other than Farmland." The trace ID attribute 802*b* has a role of an identifier indicating which one of the cultivation history (crop information) 810 or the series of trace IDs 811 is linked with the trace information recording table 802.

The case where different kinds of crops are stored in the depository often holds in particular for grain or the like. Even in such a case, it is extremely important to manage what kinds of crops are mixed in the depository. If different kinds of crops are not stored in the depository, only one trace ID may be used as the series of trace IDs 811.

Thereby, it is possible to handle both the cases of storing and not storing different kinds of crops in the depository.

Meanwhile, in order to issue a trace ID, the trace number issuance management table 801 is referred to for already issued trace numbers. Then, a trace number yet to be issued is issued.

Referring back to FIG. 4A, transmission data pieces (FIG. 3B) transmitted from the terminal which are pieces of information on an ID of a machine (referred to as an ID-transmitted machine with reference to FIG. 4A), location information on the ID-transmitted machine, and time of day information are received, and the pieces of machine location information and time of day information are recorded in the machine transaction table 621 (FIG. 6C) (Step S401). Then, the machine attribute management master 604 is referred to based on the machine ID information piece to acquire a piece of information on an attribute of the ID-transmitted machine (Step S402). Next, the machine transaction table 621 is referred to based on the machine ID information piece to judge whether or not a trace ID for the transportation has been registered therein.

Then, if a trace ID has been registered in the machine transaction table 621, the trace ID is extracted.

It should be noted that a trace ID is issued at the time of linking the ID-transmitted machine with a farmland or a warehouse which is a departure point on the basis of a piece of location information and then recorded to the machine transaction table 621. Thus, if it is not judged in Step S403 that the trace ID has been recorded (NO), the ID-transmitted machine is judged to be a machine having not been linked with any planimetric feature, and thus the From attribute 604*b* is extracted from the machine attribute management master 604 (Step S404).

According to the table showing relations between the machine types and linked objects in FIG. 2D, the From attribute showing from what a machine is linked has only two types: a planimetric feature; and a machine. If the ID-transmitted machine has the From attribute of the machine-to-planimetric-feature linking type such as a combine (the From attribute is 1) in Step S405), the GIS is searched based on the location information piece of the ID-transmitted machine by using a search function generally provided to the GIS to find a planimetric feature neighboring the ID-transmitted machine (for example, a planimetric feature in which the ID-transmitted machine is located, which the ID-transmitted machine contacts, or near which the ID-transmitted machine is located, or a planimetric feature located at the closest position among planimetric features near the ID-transmitted machine) (Step S406). If a neighboring planimetric feature exists (YES in Step S407), a trace ID is newly issued and the trace ID and "1. Farmland" are written in the trace information recording table 802 in FIG. 8 for the trace ID 802*a* and the trace ID attribute 802*b*, respectively. In addition, the farmland ID 602*a* and the farmland cultivation history 602*c* in FIG. 6A are recorded as the departure ID 802*c*. In this manner, the trace ID is issued and recorded (Step S408). This process links the harvester and the farmland together based on the location information piece.

If the From attribute is of the machine-to-machine linking type (the From attribute is 2)) in Step S405, the GIS is searched to judge whether or not the ID-transmitted machine is located near a machine having a trace ID, that is, a machine linked with a planimetric feature (Step S409). If a machine linked with a planimetric feature exists near the ID-transmitted machine (YES in Step S410), a trace ID of the machine found in Step S409 is recorded as a trace ID of the ID-transmitted transportation machine (Step S411). Then, the piece of transaction information on the machine found in Step S409 becomes unnecessary and thus is deleted therefrom (Step S412). By performing this process, the information piece for identifying the farmland ID associated with the harvester trace ID is passed on as an ID of the ID-transmitted transportation machine.

Next, description will be given with regard to a case where it is judged in Step S403 that the trace ID has already been recorded (YES). Having recorded the trace ID means that the ID-transmitted machine has been linked to a certain planimetric feature in the process from Step S404 to Step S408 or from Step S404 to Step S412. If it is judged in Step S403 that the trace ID has been recorded (YES), the process proceeds to Step S413. In step 413, it is judged whether or not a destination ID has been recorded. If the destination ID has not been recorded (NO), a To attribute is extracted from the machine attribute management master 604 in Step S414. According to FIGS. 2C and 2D, the To attribute which indicates to what the ID-transmitted machine is to be linked has two types: a machine; and a planimetric feature (place) (2) or 3)). If the ID-transmitted machine is to be linked to a machine (the To attribute is 2)) (2) in Step S415), no particular process is required because an object on the information receiving side passes on the information on the planimetric feature in Steps S409 to S412.

On the other hand, if the ID-transmitted machine is to be linked to a planimetric feature (the To attribute is 3) in Step S415), the GIS is searched to find a neighboring planimetric feature based on the location information piece of the ID-transmitted machine (Step S416). If a neighboring planimetric feature is found (YES in Step S417), the trace ID for the ID-transmitted machine is registered as the trace ID 702*a* in the stock information management table 701 shown in FIG. 7A together with the current time of day (Step S418).

Here, description is given with reference to FIG. 7A. The stock information management table 701 shown in FIG. 7A includes the storage place ID 701*a* for identifying a storage place, the stock capacity 701*b* of the depository, the variety 701*c* of a stored crop, and the storage place attribute 701*d*. The depository attribute 701*d* will be described later. A trace ID is issued for each transportation. Thus, if there are n transportations, the storage place ID 701*a* is linked with trace IDs 1 to n, warehoused amounts 1 to n, and dates and times 1 to n.

Meanwhile, pieces of transaction information on a machine need to be deleted sooner or later, but are held until the machine departs from a planimetric feature of a destination. Without the holding, the machine might be linked with another warehouse immediately after the machine transaction information pieces are deleted. The holding prevents such erroneous linking.

For a departure judgment process to be performed later, an ID of the destination where the ID-transmitted machine reaches is recorded as the destination ID 621*b* (Step S419).

Then, referring back to Step S413, if a destination ID has been registered in the above described manner (YES in Step S413), it is judged whether or not the ID-transmitted machine moves a predetermined distance or more away from the planimetric feature having the destination ID (Step S420). If YES in Step S420, the work is considered to have been completed, and thus the machine transaction information pieces of the ID-transmitted machine are deleted from the machine transaction table 621 (Step S421).

Figure 4B:
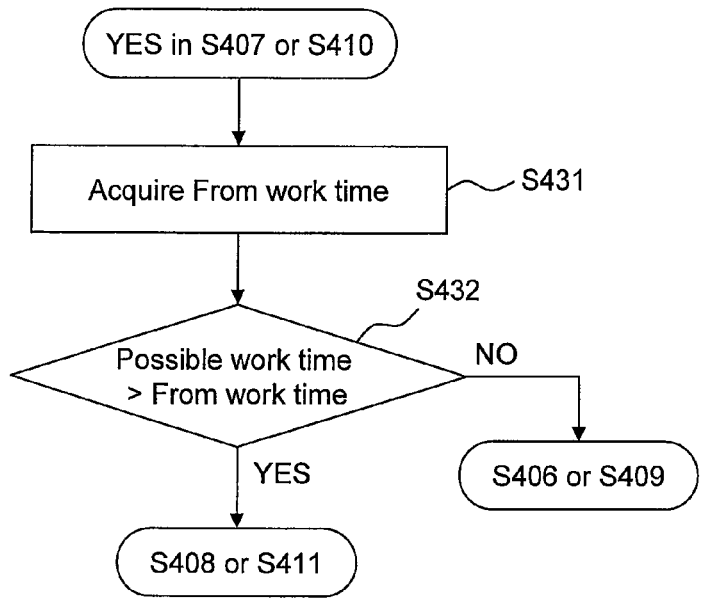
FIGS. 4B and 4C are flowcharts respectively showing processes in a second embodiment and some processes to be changed in FIG. 4A.

FIGS. 5A and 5B are diagrams showing how information is passed on by the series of processes shown in FIGS. 4A to 4BB. FIG. 5A shows an example of how the information is passed on in a case where a crop is moved in the order of a farmland A, a harvester B, a transportation machine C, and a warehouse D, and further is transported to a shipping destination F by a transportation machine E. Including events (1) to (7), FIG. 5B shows how a trace ID and a destination ID transit in the series of processes. Note that a trace ID and a destination ID of each of the machines B, C and E correspond to one of the trace IDs and the destination IDs in the machine transaction table 621 in FIG. 6C, respectively, and a trace ID of each of the warehouse D and the shipping destination F corresponds to one of the trace IDs in the stock information management table 701 in FIG. 7A.

Firstly, when the harvester B harvests the crop in the farmland A, X1 which is a newly issued trace ID is recorded as a trace ID of the machine B in the process of Steps S406 to S408 in FIG. 4A ((1) in FIG. 5B).

Next, when the transportation machine C contacts the harvester B, X1 which is the trace ID of the harvester B is passed on as a trace ID of the transportation machine C. The trace ID of the harvester B is deleted in Step S412 in FIG. 4A ((2) in FIG. 5B).

Next, when the transportation machine C is located near the warehouse D, X1 which is the trace ID of the transportation machine C is passed on as a trace ID of the warehouse D in the process of Steps S416 to S418 in FIG. 4A ((3) in FIG. 5B). In addition, the warehouse D is set as the destination ID of the transportation machine C. Note that the information (the destination ID=D) of the transportation machine C is deleted when the transportation machine C departs from the warehouse D ((4) in FIG. 5B) because the destination of the transportation machine C is no longer the warehouse D.

Likewise, when the transportation machine E is located near the warehouse D, a trace ID=Y1 is newly issued ((5) in FIG. 5B).

When the transportation machine E is located near the shipping destination F, the information Y1 is passed on to the shipping destination F ((6) in FIG. 5B). Incidentally, the trace ID of the warehouse D is cleared when the stock of the warehouse D reaches zero. When the transportation machine E departs from the warehouse F, the trace ID and the destination ID of the transportation machine E are deleted ((7) in FIG. 5B).

The series of processes as described above makes it possible to automatically record that the crop harvested in the farmland A is transported to the warehouse D with the machines B and C interfacing therebetween. The series of processes also makes it possible to automatically keep records indicating where (such as the shipping destination F) the crop transported out of the warehouse D is transported to with the machine E interfacing therebetween. Since there is no manual processing in the course of the transportations, reliability of the crop traceability is enhanced.

Second Embodiment

Next, description will be given with regard to a crop traceability system according to a second embodiment. In the second embodiment, the invention relates to improvement in accuracy of the technique of linking a harvester or a transportation machine with a target planimetric feature according to the first embodiment.

Specifically, the description will be given by taking, for example, FIG. 1A as an example. FIG. 1A shows that the transportation machine 118 moves to the warehouse 114 while passing by the warehouse 115. In such a case where warehouses are located close to each other as described above, only location information might not be sufficient to judge at which warehouse unloading work is performed.

Hence, attention is focused on a fact that harvesting work or cargo loading or unloading work with a machine requires a certain time period. On condition that a machine contacts a certain planimetric feature or another machine for a predetermined time period or longer, the machine is linked with the corresponding object. Thereby, the accuracy of linking with the object can be enhanced.

The machine attribute management master 604 in FIG. 6B is designed to be capable of managing the From work time 604*d* and the To work time 604*e* for each machine identified by the ID. The From work time 604*d* is: a minimum work time required, for example, for a harvester to harvest a crop in a farmland; or a minimum work time required for a transportation machine to receive a cargo from a harvester (in short, the shortest required time for receiving a cargo). In contrast, the To work time is a minimum work time required for unloading a cargo (in short, the shortest required time for unloading a cargo).

With reference to the flowcharts in FIGS. 4A to 4BB, description further will be given with regard to a process of searching for a linked planimetric feature in Step S406. As shown in FIG. 4B, in Step S431 which is branched from Step S407 in FIG. 4A, the From work time 604*d* is acquired, and in Step S432 a possible actual-work time (a time period during which the ID-transmitted machine stays in the location) and the From work time 604*d* are compared with each other. If the possible actual-work time is longer than the From work time 604*d* (YES), it is assumed that the work has been actually performed, and the process proceeds to Step S408. If the possible actual-work time is not longer than the From work time 604*d* (NO), it is assumed that the work has not been actually performed, for example, the ID-transmitted machine is just parked there, and the process proceeds to Step S406.

As described above, the process is added in which the From work time of the ID-transmitted machine is extracted, a relation thereof with information on location of the ID-transmitted machine and the time of day in the transmission data format (FIG. 3B) is referred to, and it is judged whether or not the ID-transmitted machine stays by a single planimetric feature for a time period equal to or longer than a value of the From work time. Thereby, the planimetric feature can be judged as a planimetric feature to be linked with the ID-transmitted machine. Likewise, the determination process as shown in FIG. 4B is added to a process in Step S410, the judgment process being one for judging whether or not the ID-transmitted machine stays by another machine for a time period equal to or longer than the From work time. This makes it possible to judge that the other machine is to be linked with the ID-transmitted machine.

Figure 4C:
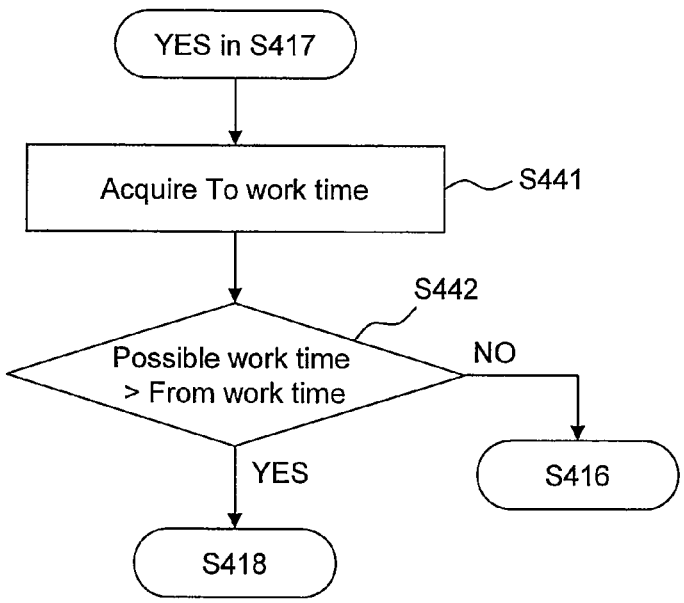

On the other hand, as shown in FIG. 4C, in Step S441 branched from Step S417 the To work time 604*e* is acquired, and in Step S442 a possible actual-work time (a time period during which the ID-transmitted machine stays in the location) and the To work time 604*e* are compared with each other. If the possible actual-work time is longer than the To work time 604*e* (YES), it is assumed that the work has been actually performed, and the process proceeds to Step S418. If the possible actual-work time is not longer than the To work time 604*e* (NO), it is assumed that the work has not been actually performed, for example, the ID-transmitted machine is just parked there, and the process proceeds to Step S416.

As described above, the process is added to the process of linking the ID-transmitted machine to a planimetric feature which is a destination, the process being one for extracting the To work time of the ID-transmitted machine and for judging whether or not the ID-transmitted machine stays by the planimetric feature for a time period equal to or longer than the To work time. This makes it possible to judge that the planimetric feature is to be linked to the ID-transmitted machine.

Third Embodiment

Figure 9A:
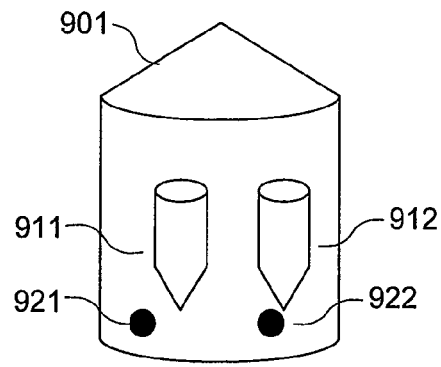
FIGS. 9A to 9C are examples of cases of identifying a place by using an IC tag in a system according to a third embodiment.

Next, description will be given with regard to a crop traceability system according to a third embodiment. The system according to this embodiment is preferably used in a case where a planimetric feature to be linked cannot be identified based on only location information using the GPS. For example, as shown in FIG. 9A, there are many cases where a single warehouse 901 has multiple (here, two) depositories A 911 and B 912 separated therein. In such a case, for example, such an identification component as an IC chip 921 or a barcode 922 that is capable of identifying a depository is attached to each of entrances of the separate depositories A 911 and B 912 so as to correspond to the entrance. Then, a terminal having a reading function reads code of the IC chip 921 or the barcode 922. Triggered by the reading, identification information of the depository is transmitted to the server. This makes it possible to identify an even depository which the GPS has missed.

Figure 9B:
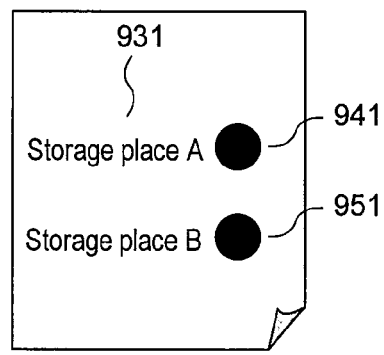

Alternatively, as denoted by reference numeral 931 in FIG. 9B, an IC chip or a barcode for identifying an ID of a storage place (identifying which place in a warehouse is a storage place) may be attached to a sheet so as to be read by a terminal. A terminal here referred to is such a terminal having a function to read an IC chip or a barcode (a function of an IC chip reader, a barcode reader, or the like). If the terminal in the first embodiment is a portable terminal, the terminal can be used. Alternatively, a general mobile phone or the like can be used.

Figure 9C:
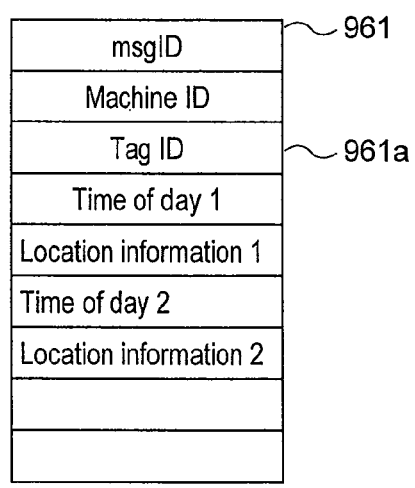

In this case, a data format to be transmitted from the terminal is not the data format denoted by 331 in FIG. 3A. As shown in FIG. 9C, as denoted by reference numeral 961, the data format is changed to a format provided with a tag ID 961*a* for identifying a tag such as an IC chip or a barcode. Furthermore, the stock information management table 701 in FIG. 7A on the server side is designed to include the storage place attribute 701*d* for identifying whether a storage place is judged based on only location information or by reading an ID by the terminal.

Figure 9D:
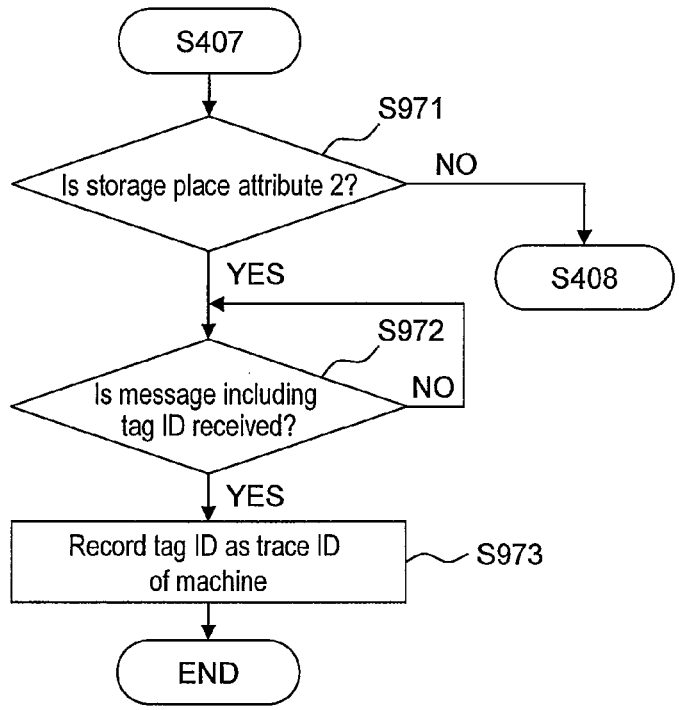
FIGS. 9D and 9E are flowcharts showing flows of processes in the system according to the third embodiment and show some processes to be changed in FIG. 4A.

As shown in FIG. 9D, the server having received data pieces performs the following process. Specifically, after the process in Step S407 in FIG. 4A, it is judged as in Step S971 whether the storage place attribute is 1 or 2. If the storage place attribute is 2, that is, if the depository is determined based on a tag ID, no process is performed until a tag ID is transmitted in the transmission data format denoted by 961 as shown in Step S972. When being received, the tag ID is recorded as a trace ID of a machine (Step S973). The machine is not linked with a planimetric feature until the above process is performed. If NO in Step S971, the process proceeds to Step S408.

Figure 9E:
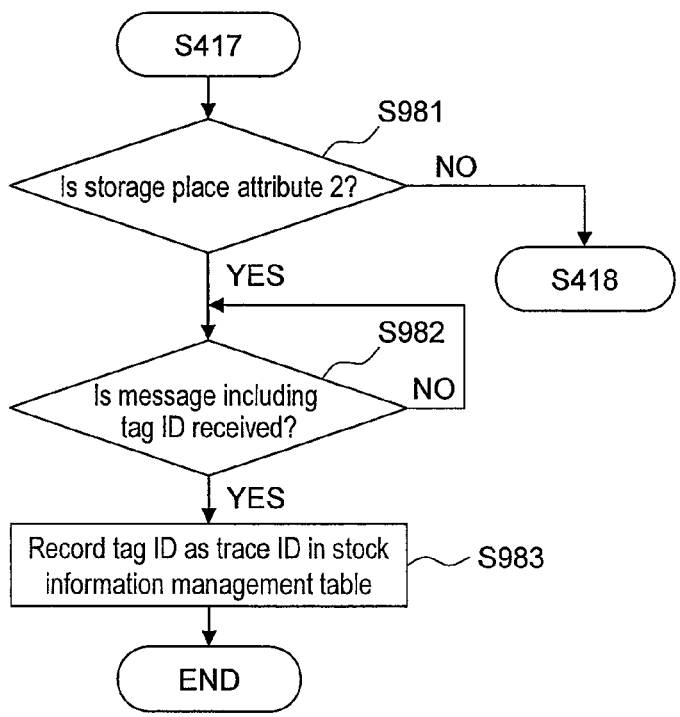

In addition, suppose a case, as shown in FIG. 9E, where a depository which is a destination is determined based on a tag ID in a process of linking the machine to a destination after Step S417 in FIG. 4A (the storage place attribute is 2 in Step S981). In this case, when a message is transmitted in the transmission data format denoted by 961 (YES in Step S982), the tag ID is recorded as a trace ID in the stock information management table 701 in Step S983. The machine is not linked to a depository until the above process is performed. If NO in Step S981, the process proceeds to Step S418.

As described above, according to this embodiment, even if multiple storage places exist in a depository, the storage places can be properly identified by adding and changing only a few processes. It goes without saying that such a technique is applicable to a case where there are multiple separated farmlands, shipping destinations, or the like.

Fourth Embodiment

Next, a fourth embodiment will be described. This embodiment is an embodiment related to a mixture prevention technique by which a crop transported to a depository is prevented from being mixed with a different type of crop or a different cultivation-technique-based crop.

As shown in the farmland attribute table 602 in FIG. 6A, the server manages crop information 602*c* on crops cultivated in farmlands, such as a type of a crop and a cultivation with a reduced agricultural chemical. Likewise, in the depository attribute table 603, the server manages, as the attribute which is the accommodated crop information 603*c*, attributes related to the crops to be stored in a depository, such as a type of a crop and cultivation with a reduced agricultural chemical. Note that if a crop to be cultivated in a certain farmland is changed to another one, or if a depository is once evacuated and then accommodates another type of crop, the information is preferably rewritten as appropriate.

Figure 10A:
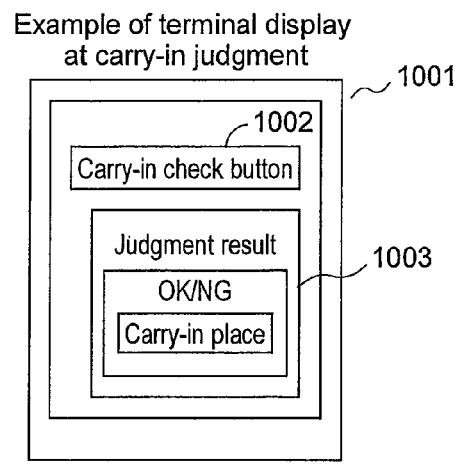
FIG. 10A is a diagram showing a display screen for carry-in judgment in a system according to a fourth embodiment.
Figure 10B:
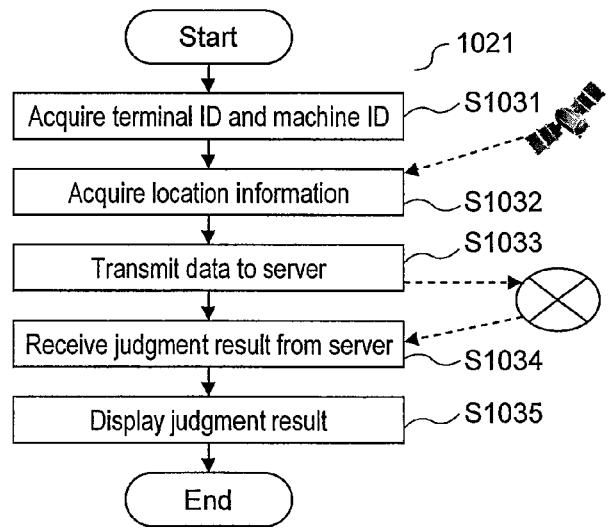
FIG. 10B is a flowchart showing a flow of a process performed on the terminal side among carry-in (availability) judgment processes in the system.

With reference to FIG. 5B, when the transportation machine C arrives at the warehouse D in (3) or when the transportation machine E arrives at the shipping destination F in (6), the mixture prevention function can be utilized. In other words, only in a case where a transportation machine arrives at a warehouse as in (3) or (6), a process is performed by utilizing a fact that values are set in the trace ID 621*a* and the destination ID 621*b* in the machine transaction table 621 (FIG. 6C). In a case other than (3) and (6), since a transportation machine has not arrived at a destination, the mixture prevention process is invalid. Hereinbelow, description will be given with regard to this embodiment with reference to FIGS. 10A and 10B.

Figure 10C:
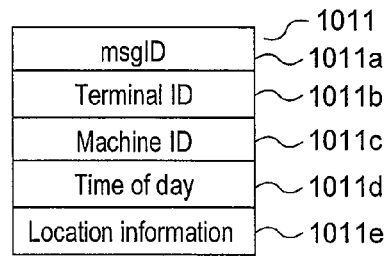
FIG. 10C is a diagram showing an example of transmission data format used by the terminal in the system.

Reference numeral 1001 denotes an example of displaying a screen of a terminal at the time of carry-in judgment. For example, in FIG. 1A, when the transportation machine 118 carries a crop in the depository 114, data pieces shown in a transmission data format 1011 in FIG. 10C are transmitted by pressing a "carry-in check button" 1002 on a display screen of the terminal 132 mounted on the transportation machine 118. The transmission data format 1011 includes an msgID 1011*a*, a terminal ID 1011*b*, a machine ID 1011*c*, location information 1011*e* at the time of transmission, and a time of day 1011*d* at that time. The data pieces are transmitted to the server by a series of carry-in judgment processes denoted by 1021 in FIG. 10B.

Specifically, a terminal reads a terminal ID and a machine ID which are recorded in the terminal (Step S1031), acquires information on the current location from the GPS or the like (Step S1032), and transmits the data pieces to the server (Step S1033). When receiving a judgment result (judgment of OK or NG as a carry-in place) transmitted back from the server (Step S1034), the terminal displays the content as carry-in place information and the judgment result on the screen in FIG. 10A (Step S1035).

Figure 10D:
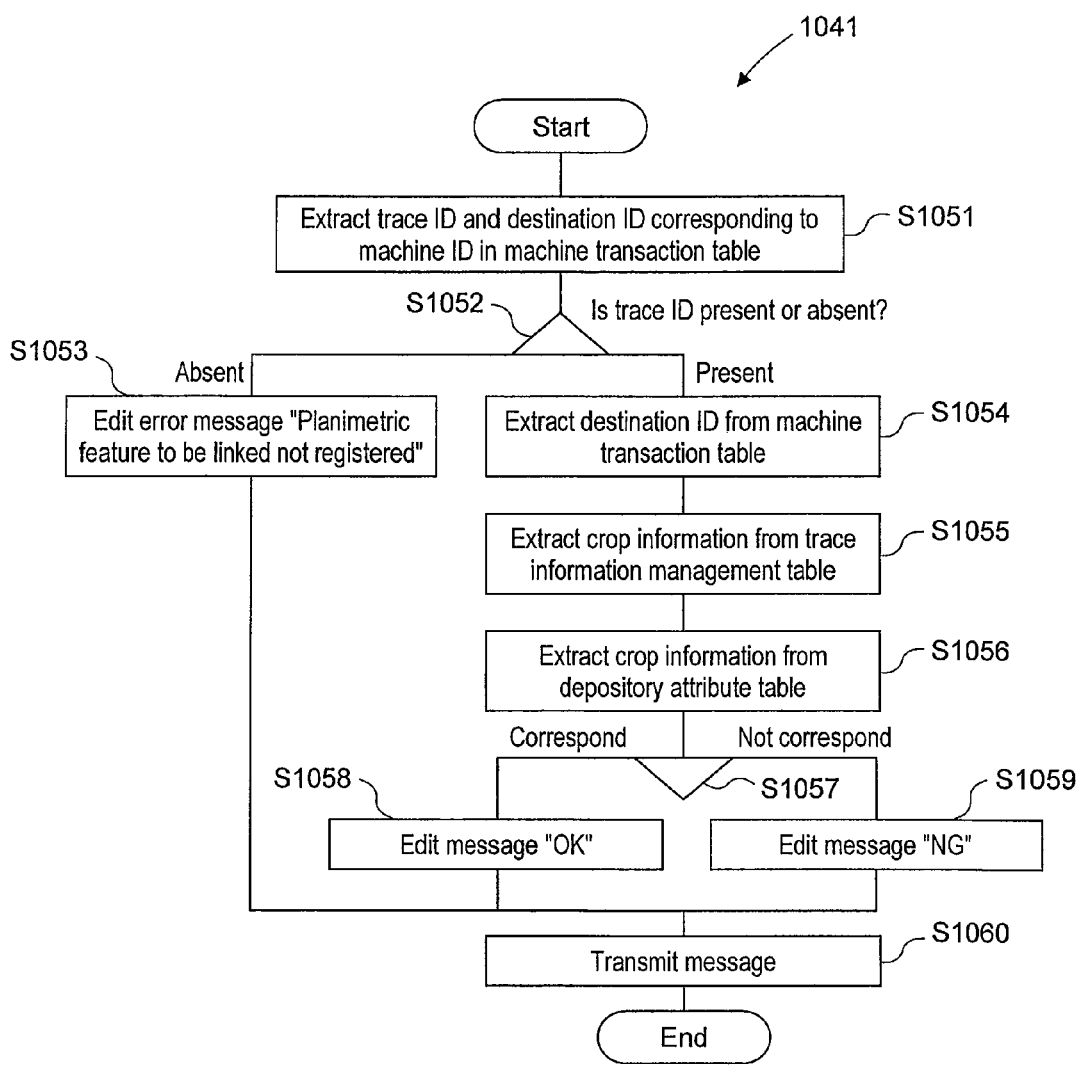
FIG. 10D is a flowchart showing a flow of a process performed by the server side among the carry-in (availability) judgment processes.

FIG. 10D is a flowchart (1041) showing a process flow on the server side. If the msgID 1011a in a message in the transmission data format 1011 received from the terminal represents a carry-in check, the server extracts data pieces of the trace ID 621a and the destination ID 621b from the machine transaction table 621, the data pieces corresponding to the machine ID in the message (Step S1051).

If no value is set in any of or each of the trace ID 621a and the destination ID 621b (a judgment process in Step S1052), an error message is edited to indicate that it is too early to have pressed the check button (a planimetric feature to be linked has not been registered) (Step S1053).

On the other hand, if a value is set in each of the trace ID 621a and the destination ID 621b (present in Step S1052), the value of the destination ID 621b is extracted from the machine transaction table 621 (Step S1054) because a machine has arrived at the destination and been linked to the destination. Subsequently, a corresponding crop information piece in the cultivation history 810 is extracted in the trace information recording table 802 (FIG. 8) by using the trace ID (Step S1055), and then a corresponding piece of information in the crop information 603c in the depository attribute table 603 is extracted in the planimetric-feature attribute management master 601 by using the depository attribute (Step S1056). If the crop information piece extracted in Step S1055 and the crop information piece extracted in Step S1056 coincide with each other, a location information piece of the planimetric feature and a message are edited to indicate that a crop corresponding to the crop information piece may be carried in the depository (OK) (Step S1058). If the crop information pieces do not coincide with each other, a message is edited to indicate that the crop must not be carried in the depository (NG) (Step S1059). Then, the message is transmitted back to the terminal having the transmitted terminal ID, the message indicating that the crop must not be carried in the depository or the like (Step S1060).

As described above, according to this embodiment, if a different type of crop or a different cultivation-technique-based crop is transported to a depository, the crop is prohibited from being carried in the depository. Thus, it is possible to prevent a crop stored in the depository from being mixed with a different type of crop or a different cultivation-technique-based crop.

Fifth Embodiment

Next, description will be given with regard to a fifth embodiment. This embodiment provides the following system. Specifically, an amount of a crop carried in a warehouse is automatically recorded. The server is provided with a comparison unit configured to compare the automatically recorded amount of the carried-in crop with an estimated amount of a crop from a predetermined farmland to be carried in the warehouse. Thereby, if a crop from a farmland other than the predetermined farmland is carried in the warehouse, the carry-in is detected in a process performed later.

Generally, when a crop is carried in a warehouse, a paper recording slip is often used to record an amount of the carried-in crop. Here, suppose a case where a crop harvested in a farmland other than a predetermined farmland is carried in a warehouse and taken as a crop from a predetermined farmland, and thus an amount of the carried-in crop is wrongly recorded. In this case, even if the amount of the stored crop is unreasonably large, it is often difficult to judge the mixture of the crops. This is because in many cases an estimated amount of the crop to be harvested from the predetermined farmland is not managed.

To solve the problem, the following system is provided in this embodiment. Specifically, in the system, an estimated amount of a crop to be harvested in a predetermined farmland (or a harvest amount averaged over predetermined years) is managed in advance as one of the farmland attributes 602c as shown in the farmland attribute table 602 in FIG. 6A, and a transportation amount which is transportable by a transportation machine at a time is also managed as the loadable amount 604f (whereby a value of an estimated transportation amount can be obtained) as shown in machine attribute management master 604. When the values of the estimated harvest amount and the estimated transportation amount are calculated and compared with each other by the comparison unit, it can thereby be checked whether or not a crop is carried in the warehouse from an agricultural field other than the predetermined farmland. In this case, every time a transportation machine arrives at a destination, a transportation amount is recorded as the warehoused amount 702b in the stock information management table 701.

Figure 11D:
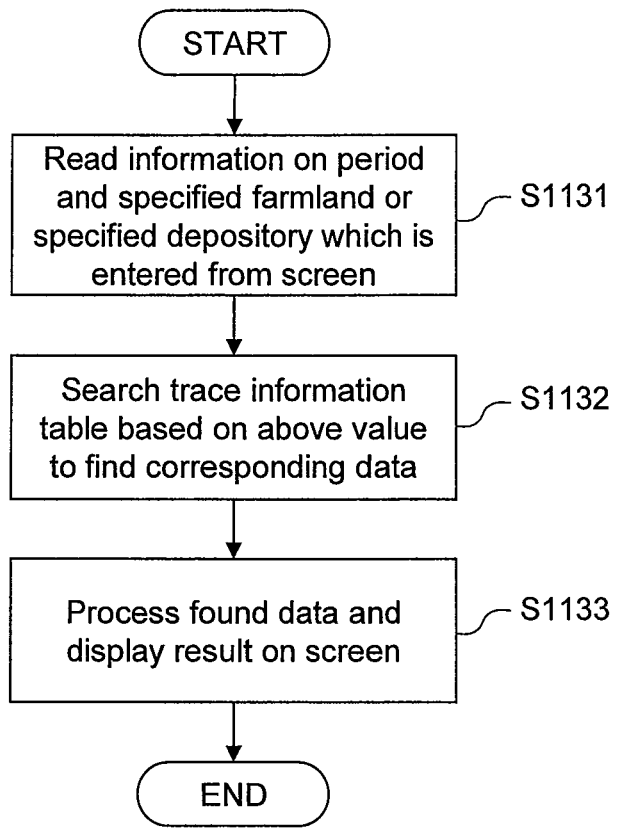
FIG. 11D is a flowchart showing a flow of warehoused or shipped amount check process performed on the server side in the fifth embodiment.

FIG. 11A is a diagram showing a display example 1101 of a PC screen for checking a transportation result. FIG. 11D is a flowchart showing a flow of a process of checking a warehoused or shipped amount. A target period to be traced (specified period) 1111 and target places (specified places: a farmland name/a depository name) 1112 can be specified through a PC screen or the like (Step S1131), and thus a screen 1113 (result display area) for showing a search result is provided. If a target place is a farmland, in order to display how much and to where a crop is transported from the farmland, the trace information recording table 802 shown in FIG. 8 is searched based on an ID of the farmland (departure ID 802c in FIG. 8) and the specified period (date and time 802f in FIG. 8) to find corresponding data pieces (Step S1132).

When the corresponding data pieces are found, the shipped amounts are sorted for easy viewing, for example, on a date or a destination basis and then displayed on the screen (Step S1133). If the specified place is a depository, pieces of information on the warehousing into the depository are edited and displayed on the screen as in a result display example 1122 for farmland specification.

For example, if the specified place 1112 is a farmland A indicated by a farmland ID as shown in FIG. 11B, the estimated harvest amount 602c is obtained from the farmland attribute table 602. On the other hand, an estimated amount of a crop carried out from the farmland A is obtained in the following manner. Specifically, the trace information recording table 802 is searched based on the specified period 111 to narrow down the range of the date and time information 802f in the trace information recording table 802. Then, the trace information recording table 802 is searched in the range to find machine IDs each corresponding to the departure ID 802c coinciding with the farmland A. Thereafter, based on the machine IDs, values recorded in the loadable amount 604f in the machine attribute management master 604 are summed up. The same holds for a case of specifying a depository instead of a farmland.

A display screen 1121 shown in FIG. 11B is designed to be capable of managing and displaying a target farmland, an estimated harvest amount, a destination, and an estimated carry-out amount as pieces of trace information on the farmland, as well as a depository, a machine, carrying-out times, and an estimated carry-out amount which are sorted on a date basis.

A result display example 1122 for depository specification shown in FIG. 11C displays a name of a target depository as well as a farmland, an estimated harvest amount, a machine, carry-in times, and an estimated carry-in amount which are sorted on a date basis, as pieces of information on a source for carry-in.

As described above, this embodiment provides the system in which: an estimated harvest amount harvestable in a determined farmland is managed as one of the farmland attributes; a carried-in amount is managed which is obtained based on the number of times of transportations and transportation amounts each transportable by a transportation machine at a time as in the machine attribute master 604; and by using a comparison unit configured to calculate values of the estimated harvest amount and the carried-in amount and to make a comparison therebetween, it can be checked whether or not a crop is carried in a depository from an agricultural field other than the determined one.

Sixth Embodiment

Next, description will be given with regard to a sixth embodiment. While the fourth embodiment aims to check whether or not a crop is delivered to an intended destination at the time of delivery, the sixth embodiment relates to a technique of preventing erroneous carry-in. Specifically, a transportation destination and a route to the transportation destination are determined in advance, and when a transportation machine deviates from the predetermined route to the transportation destination, the deviation is detected. By detecting the fact that the transportation route is different from the predetermined route, a crop is prevented in advance from being carried in a wrong depository.

Figure 12A:
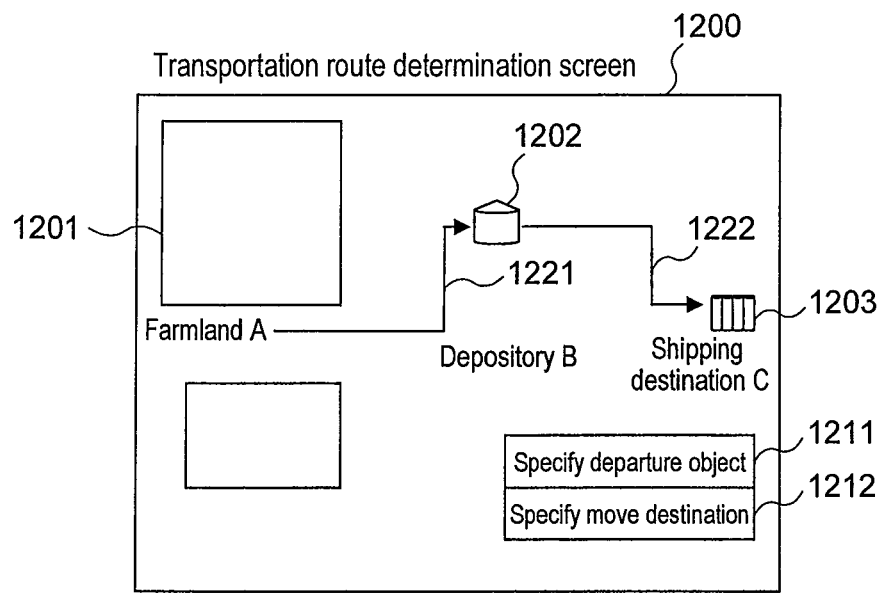
FIG. 12A shows a display example of a transportation route determination screen in a sixth embodiment.
Figure 12B:
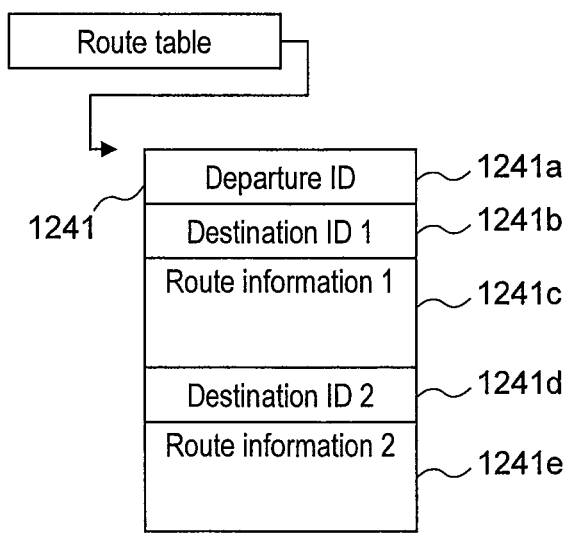
FIG. 12B shows a configuration example of a route table.
Figure 12C:
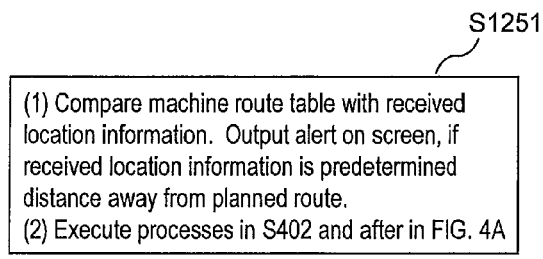
FIGS. 12C and 12D are flowcharts showing flows of processes in a system according to the sixth embodiment.
Figure 12D:
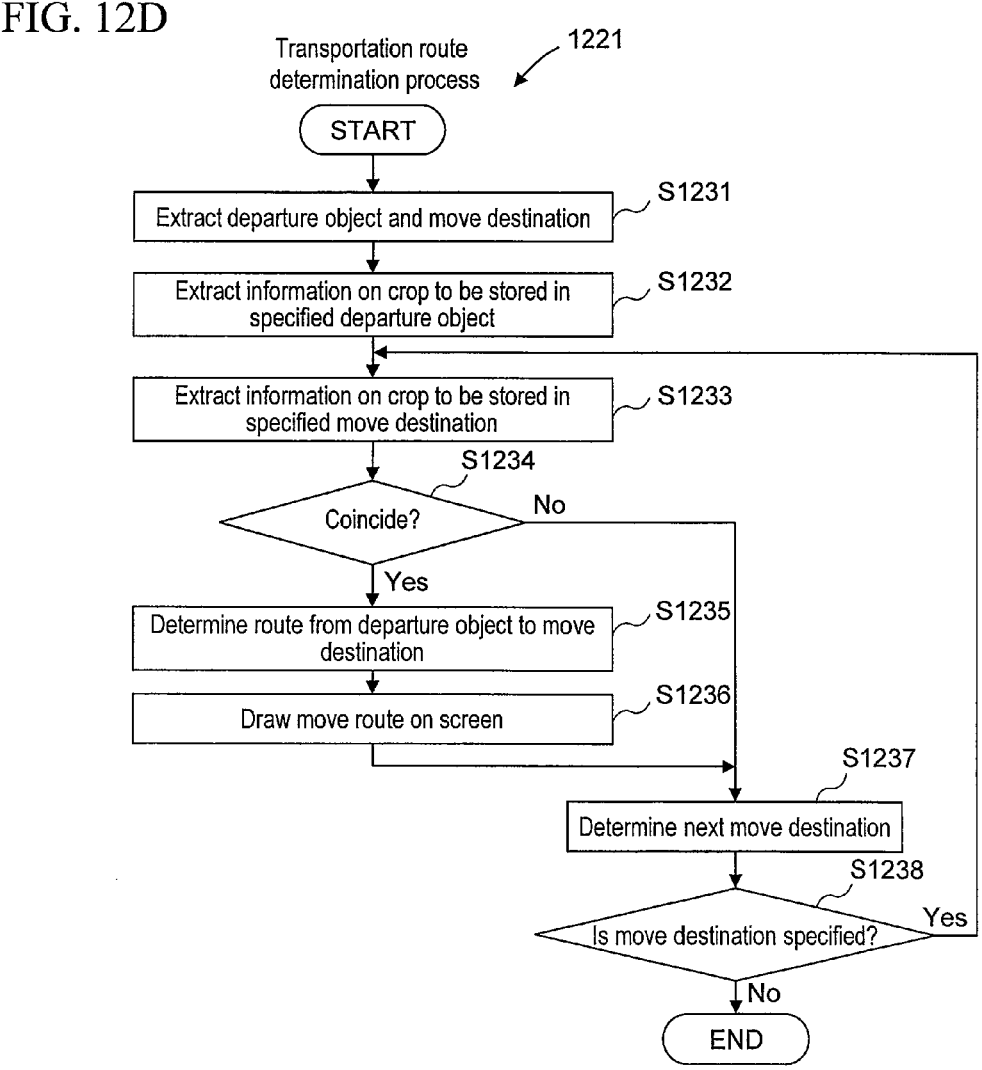

Reference numeral 1221 in FIG. 12D denotes an example of a transportation route determination process performed by the server. In the example, firstly, an object from which a crop is moved (hereinafter, referred to as a departure) is specified. Here, description is given with reference to a transportation route determination screen in FIG. 12A as well. The diagram denoted by reference numeral 1200 in FIG. 12A shows a display screen example of displaying a route. The crop is transported from a farmland A 1201 to a depository B 1202 via a route 1221 to be stored therein and then reaches a shipping destination 1203 via a route 1222. Note that since a Specify Departure Object button 1211 and a Specify Move Destination button 1212 are provided on the screen, the depository B 1202 can be specified as a departure object or a move destination.

A route table 1241 shown in FIG. 12B is designed, in consideration of a possibility that there are multiple depositories in which the crop is carried, to store a ToID (a destination ID) and a piece of information on a route to the corresponding destination in each of the destinations belonging to a departure ID 1241a. In other words, the route table 1241 has a configuration in which a destination ID (1) 1241b, route information (1) 1241c, a destination ID (2) 1241d, and route information (2) 1241e are included.

As shown in FIG. 12D, in the transportation route determination process 1221, a departure object and a move destination which are specified are extracted (Step S1231). For example, the departure object is the farmland A or the warehouse (depository) B. Likewise, a corresponding information piece in the crop information 602c which is one of attribute information pieces of the specified departure object is extracted from the farmland attribute table 602 (Step S1232).

Likewise, a corresponding information piece in the crop information 603c which is one of the attribute information pieces of the move destination is extracted from the depository attribute table 603 (FIG. 6A) by specifying the move destination (Step S1233). If the attributes of the respective crop information pieces 602c and 603c coincide with each other (YES in Step S1234), the departure object is linked to the move destination, and a route from the departure object to the move destination is determined by a route selection process generally performed by the GIS technique (Step S1235). Then, a departure ID, a destination ID, and the route information piece are recorded in the route table 1241, and the route is displayed on the map screen as shown in FIG. 12A (Step S1236).

Subsequently, a next move destination is specified (Step S1237). If a move destination is specified (YES in Step S1238), the process returns to Step S1233. If not (NO), the process is terminated (END). As described above, the fact that the transportation route is different from the predetermined route is detected on the screen, and thereby the crop can be prevented in advance from being carried in a wrong depository.

In the process to implement the above function, Steps S409 to S411 in the process performed by the server in FIG. 4A are replaced with Step S1251 as shown in FIG. 12C. Specifically, every time the server receives a piece of location information from the terminal mounted on the ID-transmitted machine, the following processes are performed. (1) Firstly, the received location information piece is compared with pieces of information on a route planned in advance in the route table 1241. If the location is a predetermined distance away from the planned route, the display outputs a display (an alert) indicating an anomaly. This makes it possible to notify an administrator of the deviation and thus for the administrator to contact an operator of the machine by using a communication means such as a telephone. (2) If the machine moves as planned, the above function is implemented by performing Steps S402 and the following in FIG. 4A.

As described above, in the system, every time the server receives the location information piece from the terminal mounted on the machine, the server firstly compares the location information piece with the pieces of information on the route planned in advance in the route table 1241. If the location is a predetermined distance away from the planned route, the display outputs the display (alert) indicating an anomaly. The system makes it possible to prevent the actual route from deviating largely from the planned route and to adjust the route.

Seventh Embodiment

Next, description will be given with regard to a seventh embodiment. The crop trace technique in the first embodiment is a technique of automatically knowing moving of the location of a crop by using location information. Meanwhile, when the crop is delivered to a dealer or the like, the dealer might request for data of a cultivation history of the crop, that is, the type of seeds, use state of an agricultural chemical or a fertilizer, or the like.

For example, in the example shown in FIG. 1A, when a crop is transported from the warehouse 114 to the shipping destination 116, presentation of a cultivation history might be requested by a purchaser or the like. As a method generally employed for this, the cultivation history is printed at the time of shipping from the warehouse 114 and presented to the purchaser or the like at the shipping destination 116. However, this method is not capable of properly judging whether or not the printed cultivation history corresponds to the transported crop.

Hence, the terminal 133 mounted on the transportation machine 119 accesses the server 121 at the shipping destination 116 and extracts the cultivation history managed by the server 121, and the cultivation history data is printed or outputted (received by the receiver 26 and displayed by the display unit 27 in FIG. 2B). At this time, the terminal 133 is associated with the warehouse 114 and the warehouse 114 is automatically linked with the farmland 112 by using the technique according to the first embodiment above. Thus, appropriate information can be received from the server 121.

Figure 13A:
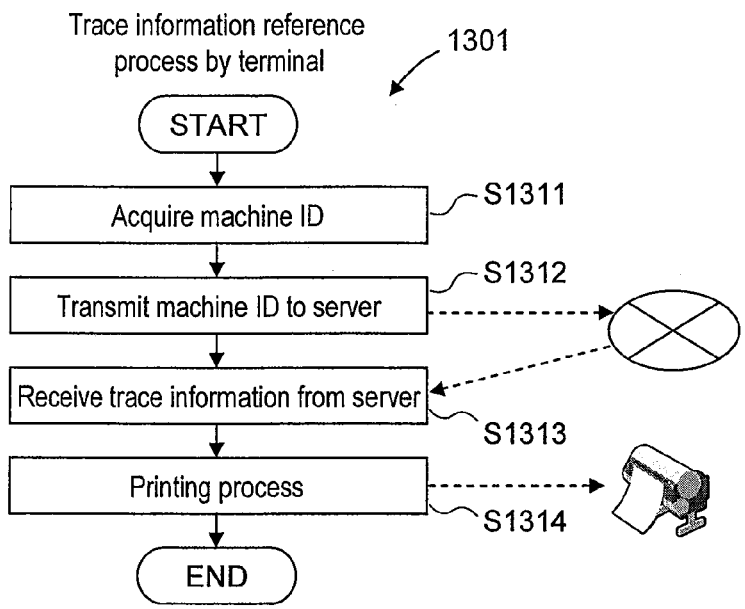
FIGS. 13A and 13B are flowcharts showing flows of cultivation history check processes in a system according to a seventh embodiment.

FIG. 13A is a flowchart showing a process performed on the terminal side. Firstly, a terminal extracts a machine ID stored therein (Step S1311) and transmits the machine ID to the server (Step S1312). Trace information is received from the server (Step S1313) and then printed by a printer located near the terminal, by using a communication technology, for example, infrared communication, Bluetooth communication; or the like. Thus, the trace information can be presented to the purchaser or the like at the shipping destination.

Figure 13B:
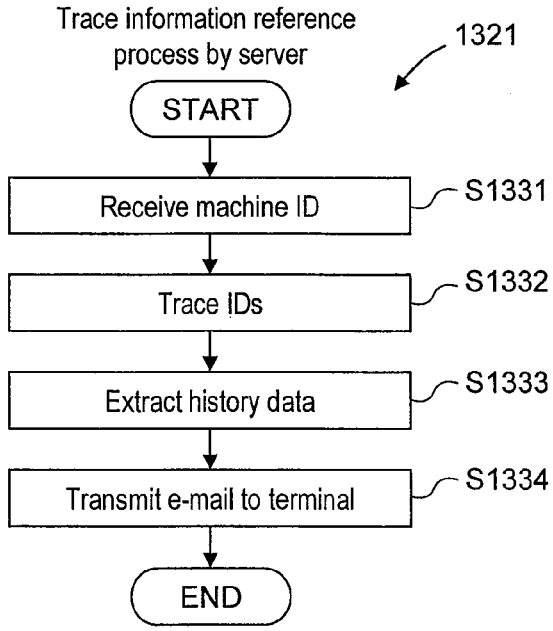

Reference numeral 1321 in FIG. 13B denotes a process performed on the server side. The server receives the machine ID from the terminal (Step S1331) and extracts a trace ID from the machine transaction table 621 (FIG. 6C) (Step S1332).

Then, the server searches the trace information recording table 802 based on the extracted trace ID. If the trace ID attribute of the matched trace ID is "2. Other than Farmland," the server extracts each of trace IDs (811 in FIG. 8) which are linked with the matched trace ID and searches the trace information recording table 802 again (FIG. 8) based on the extracted trace ID as a new ID (Step S1332). The searching process is repeated until an ID attribute of "1. Farmland" is found. Thereafter, the server extracts a cultivation history 810 including a series of data pieces of the farmland, which is found as a result of these processes (Step S1333) and transmits the extracted series of data pieces back to the terminal, for example, via e-mail (Step S1334).

Figure 13C:
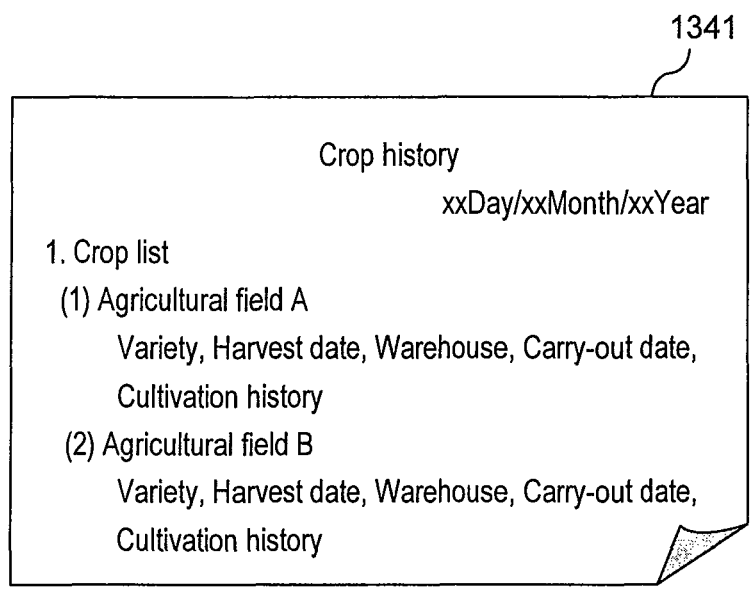
FIG. 13C is a diagram showing an example of a grain history outputted as a result of the processes in FIGS. 13A and 13B.

FIG. 13C illustrates a print display example of a grain history 1341 or the like, showing pieces of information on when and in which farmland a transported crop has been harvested, where the crop has been stored, when the crop has been carried out, and the like.

Note that if the terminal has a function of storing data in a medium like a USB flash memory, a history data may be written as electronic data to the media instead of printing. As a matter of course, if the shipping destination manages trace information pieces by using the same server, what is required is to repeat the processes described so far in this embodiment. When tracing reaches a point whose trace information pieces are managed by a different system, the above process using a medium is performed.

According to this embodiment, when information related to the quality and the like of the crop, such as a cultivation history, is requested, the terminal mounted on the transportation machine can access the server at the place where the request is made and tracing is performed based on the machine ID, extract the cultivation history managed by the server and then print or output the data at the place.

Note that the present invention may be implemented by a program for causing a computer to execute the above crop trace method or by a computer-readable recording medium in which the program is recorded.

As described above, the techniques described in the aforementioned embodiments make it possible to automatically record in which farmland a transported crop is harvested, thus saving labor in recording and enhancing reliability of records. Thereby, there can be provided a system configured to automatically prove that a lovingly cultivated crop is stored in an appropriate depository and transported to an appropriate shipping place.

EXPLANATION OF REFERENCE NUMERALS

1 . . . communication unit, 3 . . . database unit, 5 . . . ID information linking processor (ID information processor), 7 . . . data manager, 21 . . . location information acquisition unit, 22 . . . ID acquisition unit, 23 . . . timer, 24 . . . data accumulation unit, 25 . . . transmitter, 26 . . . receiver, 27 . . . display unit, 101 . . . example of screen display of GIS client, 112,
113 . . . farmland, 114, 115 . . . warehouse, 116 . . . shipping destination, 117 . . . harvester, 118 . . . transportation machine, 119 . . . large transportation machine, 121 . . . server, 122 . . . client, 123 . . . GPS satellite, 124 . . . network, 131, 132, 133 . . . terminal (transmitter), 221 . . . linking pattern, 231 . . . machine linking table, 331 . . . location-information transmission data format, 601 . . . planimetric-feature attribute management master, 602 . . . farmland attribute table, 603 . . . depository attribute table, 604 . . . machine attribute management master, 621 . . . machine transaction table, 701 . . . stock information management table,
801 . . . trace number issuance management table, 802 . . . trace information recording table, 810 . . . cultivation history (crop information), 921, 922, 941, 951 . . . tag, 961 . . . location-information transmission data format in judging planimetric feature by tag, 1001 . . . example of terminal display in carry-in judgment, 1011 . . . transmission data format in judging carry-in, 1101 . . . example of PC screen for transportation tracing check, 1121 . . . example of trace result display for farmland specification, 1122 . . . example of trace result display for depository specification, 1200 . . . transportation route determination screen, 1241 . . . moving route management table, 1341 . . . trace information reference screen (grain history)

APPENDIX

This application involves the following items.
1). A crop traceability system comprising:
  terminals each of which transmits a location information piece of the terminal itself and a machine ID of a harvester or a transportation machine for a crop (hereinafter, referred to as a machine) which moves together with the terminal itself; and
  a server which includes a communication unit and an ID information linking processor, the communication unit receiving the machine ID and the location information piece of the machine from each of the terminals, the ID information linking processor detecting that the terminals have the same location information piece or that one of the terminals has the same location information piece as that of a planimetric feature held by the server and thereby automatically linking the machine IDs of the corresponding machines together or the machine ID of the corresponding one of the machines and a planimetric feature ID of the planimetric feature together.
2). The crop traceability system according to 1), wherein the ID information linking processor performs the linking depending on types of the machines: from a planimetric feature to a machine in a case of a harvester; from a machine to a planimetric feature in a case of a transportation machine approaching the planimetric feature; or from a machine to a machine in a case of transportation machines.

3). The crop traceability system according to 1), wherein
the server includes a data manager which manages a planimetric-feature attribute management table for managing planimetric feature IDs and location information pieces of planimetric features and a machine attribute management table for managing machine IDs and attributes of machines having the machine IDs, and
the ID information linking processor detects that the same location is indicated by a location information piece of one of the planimetric features in the planimetric feature management table and by the location information piece of the machine whose machine ID received from one of the terminals corresponds to one of the machine IDs stored in the machine attribute management table and thus automatically links the planimetric feature ID of the planimetric feature and the machine ID together.

4). The crop traceability system according to 1), wherein
the server includes the data manager which manages the planimetric-feature attribute management table for managing planimetric feature IDs and location information pieces of planimetric features and the machine attribute management table for managing machine IDs and attributes of machines having the machine IDs, and
the ID information linking processor further detects that the same location is indicated by a location information piece acquired from one of the terminals with reference to a machine already linked with a planimetric feature ID of a first planimetric feature and by a location information piece of a second planimetric feature different from the first planimetric feature, which is stored in the planimetric feature management table, and thus automatically links a machine ID of the machine and a planimetric feature ID of the second planimetric feature together.

5). The crop traceability system according to 1), wherein the server manages a trace information recording table in which trace IDs as well as pairs of departure IDs and destination IDs are recorded, the trace IDs each being issued when the crop is carried out from a planimetric feature by a machine and being passed on by the linking, each pair of the departure IDs and the destination IDs being used for identifying a crop transportation route on a trace ID basis by using a planimetric feature ID of a planimetric feature in a departure place and a planimetric feature ID of a planimetric feature in a destination place.

6). The crop traceability system according to 5), wherein in the trace information recording table, the trace ID is linked with trace IDs 1 to n (n is an integer not smaller than 2) of transportations via respective different routes.

7). The crop traceability system according to any one of 5) and 6), wherein
when a machine arrives at a shipping destination, the terminal of the machine transmits a machine ID thereof to the server, and
the server searches the trace information recording table based on each of the linked trace IDs, continues tracing until a farmland is found in a trace ID attribute recorded as an attribute of each of the traces ID, retrieves a corresponding crop attribute information piece from a farmland attribute table in the planimetric feature attribute management table based on an ID of the farmland, and transmits the crop attribute information piece back to the terminal.

8). The crop traceability system according to any one of 1) to 7), wherein the terminal includes an ID acquisition unit which automatically acquires the machine ID before transmitting the machine ID to the server.

9). The crop traceability system according to any one of 1) to 8), wherein
the terminal regularly transmits a time of day information piece together with the location information piece,
the server has a minimum work time period which is set to be minimally required for each of work units, and
the server automatically performs linking on condition that a time period obtained based on the time of day information piece is longer than the minimum work time period, the obtained time period being one during which the same location information piece is transmitted.

10). The crop traceability system according to any one of 1) to 9), wherein
a detailed location identification tag which stores an information piece for detailedly identifying a storage place of the crop is provided to the storage place, and
the terminal includes a tag reader which reads a content of the detailed location identification tag.

11). The crop traceability system according to any one of 1) to 10), wherein
the server holds a first crop attribute of a crop cultivated in a farmland and a second crop attribute of a crop to be stored in a depository, and
the server has a function by which when a crop is delivered to the depository, the server makes a comparison between the first crop attribute related to the farmland linked with a machine having transported the crop and the second crop attribute related to the depository linked with the machine on the basis of an ID of the machine and thereby judges whether or not to transfer the crop having the second crop attribute to the depository.

12). The crop traceability system according to any one of 1) to 11), wherein
the server holds a piece of information on a loadable amount of the transportation machine and a piece of information on an estimated harvest amount of a farmland, and
the server includes a comparison unit which compares the estimated harvest amount with a product of the loadable amount of the transportation machine and the number of times of transportations.

13). The crop traceability system according to any one of 1) to 12), wherein
the server includes the data manager which manages a route table in which a departure point, a destination, and a route information piece of the machine are stored, and
when detecting that the location information piece of the machine which is transmitted from one of the terminals indicates deviation from a route indicated by the route information piece in the route table, the server outputs an alert.

14). A server device used in a crop traceability system, the server device comprising:
a communication unit that receives, from respective terminals each of which transmits a location information piece of the terminal itself and a machine ID of a harvester or a transportation machine for a crop (hereinafter, referred to as a machine) which moves together with the terminal itself, the machine IDs and location information pieces of the machines; and
an ID information linking processor that detects that the terminals have the same location information piece or that one of the terminals has the same location information piece as that of a planimetric feature held by the server and thereby automatically linking the machine IDs of the corresponding machines together or the machine ID of the corresponding one of the machines and a planimetric feature ID of the planimetric feature together.

15). A crop tracing method comprising:

a receiving step in which, from respective terminals each of which transmits a location information piece of the terminal itself and a machine ID of a harvester or a transportation machine for a crop (hereinafter, referred to as a machine) which moves together with the terminal itself, the machine IDs and location information pieces of the machines are received; and an ID information linking step in which the terminals are detected to have the same location information piece or one of the terminals is detected to have the same location information piece as that of a planimetric feature held by the server and the machine IDs of the corresponding machines or the machine ID of the corresponding one of the machines and a planimetric feature ID of the planimetric feature are automatically linked together.

16). A program for causing a computer to execute the crop tracing method according to 15).

What is claimed is:

1. A crop traceability system comprising:
    a terminal which moves, together with a machine, to one of harvest and transport a crop; and
    a server which receives an information from the terminal, wherein
    the terminal includes: a terminal location information acquisition unit which acquires a location information of the terminal; and a transmitter which transmits the terminal location information and a machine ID of the machine to the server,
    the server includes: a storage unit which stores a location information of a plurality of planimetric features; a receiver which receives the terminal location information and the machine ID which are both transmitted by the terminal; and an ID information processor which links the machine ID with a planimetric feature ID of one of the planimetric features when a location information of the one of the planimetric features stored in the storage unit coincides with the terminal location information transmitted by the terminal,
    the receiver receives terminal location information of a plurality of terminals and machine IDs corresponding to the plurality of terminals, which are transmitted to the receiver by each of the terminals, respectively,
    when the terminal location information transmitted by more than one of the respective terminals coincide with each other, the service ID information processor links the machine IDs corresponding to the respective terminals with each other, and
    when the terminal location information, which is transmitted by the terminal, and a location information of a second of the planimetric features, which is different from the location information of the one of the planimetric features coincide with each other, after the server ID information processor linked the machine ID and the first planimetric feature ID together, the server ID information processor now links the machine ID and a planimetric feature ID of the second, different planimetric feature.

2. The crop traceability system according to claim 1, wherein the server ID information processor stores a trace information including a route information and a trace ID assigned to the route information, the route information including the planimetric feature ID of the one of the planimetric features as a departure place and the planimetric feature ID of the second, different one of the planimetric features as a destination place.

3. The crop traceability system according to claim 1, wherein when there exist a first trace information including a first route information and a first trace ID which is assigned to the first route information and a second trace information including a second route information and a second trace ID which is assigned to the second route information, the server ID information processor links the first trace ID and the second trace ID together, the first route information including the planimetric feature ID of the one of the planimetric features as a departure place and the planimetric feature ID of the second, different one of the planimetric features as a destination place, the second route information including the planimetric feature ID of the second, different planimetric feature as a departure place and the planimetric feature ID of a third planimetric feature, which is different from the second, different planimetric feature, as a destination place.

4. The crop traceability system according to claim 1, wherein when the location information of the one of the planimetric features stored in the storage unit and the terminal location information transmitted by the terminal coincide with each other for a predetermined time period, the server ID information processor links the machine ID and the planimetric feature ID of the one of the planimetric features.

5. The crop traceability system according to claim 1, wherein the terminal includes an ID acquisition unit which automatically acquires the machine ID before transmitting the machine ID to the server.

6. The crop traceability system according to claim 1, wherein
    the terminal regularly transmits time of day information together with the terminal location information,
    the server has a minimum work time period which is set to be minimally required for each of a plurality of work units, and
    the server automatically performs linking on condition that a time period obtained based on the time of day information is longer than the minimum work time period, the obtained time period being one during which the same location information is transmitted.

7. The crop traceability system according to claim 1, wherein
    a detailed location identification tag which stores an information for identifying a storage place of the crop is provided to the storage unit, and
    the terminal includes a tag reader which reads a content of the detailed location identification tag.

8. The crop traceability system according to claim 1, wherein
    the server holds a first crop attribute of a first crop cultivated in a farmland and a second crop attribute of a second crop to be stored in a depository, and
    the server has a function by which when a crop is delivered to the depository, the server makes a comparison between the first crop attribute related to the farmland linked with a machine having transported the crop and the second crop attribute related to the depository linked with the machine on the basis of an ID of the machine and thereby judges whether or not to transfer the second crop, having the second crop attribute, to the depository.

9. The crop traceability system according to claim 1, wherein
    the server holds information on a loadable amount of the transport machine and information on an estimated harvest amount of a farmland, and the server includes a comparison unit which compares the estimated harvest amount with a product of the loadable amount of the transport machine and the number of times of transportations.

10. The crop traceability system according to claim 1, wherein
the server includes a data manager which manages a route table in which a departure point, a destination, and a route information of the machine are stored, and
upon detecting that the terminal location information of the machine which is transmitted from one of the terminals indicates deviation from a route indicated by the route information in the route table, the server outputs an alert.

11. The crop traceability system according to claim 1, wherein
the ID information processor links the machine ID with the planimetric feature ID of the first planimetric feature when the location information of the first planimetric feature stored in the storage unit coincides with the location information transmitted by the terminal; and
whereby the server links crop information of one of a crop harvested and transported by the machine in the planimetric feature with crop information corresponding to the planimetric feature stored in the storage unit.

12. A server of a crop traceability system comprising a terminal which moves together with a machine to one of harvest and transport a crop and a server which receives an information from the terminal, wherein
the server includes: a storage unit which stores location information of a plurality of planimetric features; a receiver which receives the terminal location information and the machine ID which are both transmitted by the terminal; and an ID information processor which links the machine ID with a planimetric feature ID of the one of planimetric features when a location information of the one of the planimetric features stored in the storage unit coincides with the terminal location information transmitted by the terminal, the receiver receives terminal location information of a plurality of terminals and machine IDs corresponding to the plurality of terminals, which are transmitted to the receiver by each of the terminals, respectively,
when the terminal location information transmitted by more than one of the respective terminals coincide with each other, the server ID information processor links the machine IDs corresponding to the respective terminals with each other, and
when the terminal location information which is transmitted by the terminal and a location information of a second of the planimetric features, which is different from the location information of the one of the planimetric features coincide with each other, after the server ID information processor linked the machine ID and the first planimetric feature ID together, the server ID information processor now links the machine ID and a planimetric feature ID of the second, different planimetric feature.

13. The server of a crop traceability system according to claim 12, wherein the ID information processor stores a trace information including a route information and a trace ID assigned to the route information, the route information including the planimetric feature ID of the first of the planimetric features as a departure place and the planimetric feature ID of the second, different planimetric feature as a destination place.

14. A terminal of a crop traceability system comprising a terminal which moves together with a machine to harvest or transport a crop and a server which receives an information from the terminal, wherein:
the terminal includes: a terminal location information acquisition unit which acquires a location information of the terminal; and a transmitter which transmits the terminal location information, and a machine ID of the machine, to the server, which server links the machine ID with a planimetric feature ID of a planimetric feature when a location information of the planimetric feature stored in the storage unit coincides with the location information transmitted by the terminal, the receiver receives terminal location information of a plurality of terminals and machine IDs corresponding to the plurality of terminals, which are transmitted by of the terminals, respectively,
when the terminal location information transmitted by more than one of the respective terminals coincide with each other, the ID information processor links the machine IDs corresponding to the respective terminals with each other, and
when the terminal location information, which is transmitted by the terminal, and a location information of a second planimetric feature which is different from the location information of the first planimetric feature coincide with each other, after the server ID information processor linked the machine ID and the first planimetric feature ID together, the server ID information processor now links the machine ID and a planimetric feature ID of the second, different planimetric feature.

15. The terminal of a crop traceability system according to claim 14, where the ID information processor stores a trace information including a route information and a trace ID assigned to the route information, the route information including the planimetric feature ID of the first of the planimetric features as a departure place and the planimetric feature ID of the second, different planimetric feature as a destination place.

16. A crop tracing method comprising:
providing a terminal which moves, together with a machine, to one of harvest and transport a crop;
providing a server for receiving information from the terminal;
providing an acquisition step for acquiring location information of the terminal which moves, together with a machine, to one of harvest and transport the crop;
providing a transmitting step which transmits the location information and a machine ID of the machine to the server,
providing a storing step which stores a location information of a first planimetric feature transmitted from the terminal,
providing a receiving step which receives the location information and the machine ID which are transmitted by the terminal;
providing an ID information processing step which links the machine ID with a planimetric feature ID of the first planimetric feature when a location information of the first planimetric feature stored in the storage unit coincides with the location information transmitted by the terminal,
providing a receiving step of receiving location information of a plurality of terminals and machine IDs corresponding to the terminals, which are transmitted by the terminals, respectively, the ID information processing step linking the machine IDs corresponding to the respective terminals with each other when the location information transmitted by the respective terminals coincide with each other, and providing a linking step of the machine ID and a planimetric feature ID of a second, different planimetric feature, when the terminal location information transmitted by the terminal and a location information of the second planimetric feature, which is different from the first planimetric feature, coincide with each other after the server ID information processor links the machine ID and the first planimetric feature ID together.

17. The crop tracing method according to claim 16, further including a step of storing of a trace information including a route information and a trace ID assigned to the route information, the route information including the planimetric feature ID of the first of the planimetric features as a departure place and the planimetric feature ID of the second, different planimetric feature as a destination place.

\* \* \* \* \*